(12) United States Patent
Sullivan et al.

(10) Patent No.: US 7,146,864 B2
(45) Date of Patent: Dec. 12, 2006

(54) APPARATUS HAVING A MULTI-BAND SENSOR ASSEMBLY FOR MEASURING A PARAMETER OF A FLUID FLOW FLOWING WITHIN A PIPE

(75) Inventors: James Sullivan, East Hampton, CT (US); Timothy J. Bailey, Longmeadow, MA (US); Michael A. Davis, Glastonbury, CT (US); Mark R. Fernald, Enfield, CT (US); Richard Niezgorski, Milldale, CT (US)

(73) Assignee: Cidra Corporation, Wallingford, CT (US)

( * ) Notice: Subject to any disclaimer, the term of this patent is extended or adjusted under 35 U.S.C. 154(b) by 67 days.

(21) Appl. No.: 10/795,111

(22) Filed: Mar. 4, 2004

(65) Prior Publication Data

US 2004/0231431 A1 Nov. 25, 2004

Related U.S. Application Data

(60) Provisional application No. 60/451,685, filed on Mar. 4, 2003.

(51) Int. Cl.
*G01F 1/34* (2006.01)

(52) U.S. Cl. .................................. 73/861.42

(58) Field of Classification Search ............. 73/861.18, 73/861.42
See application file for complete search history.

(56) References Cited

U.S. PATENT DOCUMENTS

| | | | |
|---|---|---|---|
| 4,048,853 A | 9/1977 | Smith et al. ............. 73/861.25 |
| 4,080,837 A | 3/1978 | Alexander et al. ......... 73/61.45 |
| 4,090,404 A | 5/1978 | Dupont et al. ................ 73/119 |
| 4,248,085 A | 2/1981 | Coulthard ................ 73/861.06 |
| 4,445,389 A | 5/1984 | Potzick et al. ........... 73/861.27 |
| 4,896,540 A | 1/1990 | Shakkottai et al. ...... 73/861.02 |
| 5,040,415 A | 8/1991 | Barkhoudarian ......... 73/861.03 |
| 5,083,452 A | 1/1992 | Hope ......................... 73/61 R |
| 5,131,278 A * | 7/1992 | Baumoel ................. 73/861.18 |
| 5,218,197 A | 6/1993 | Carroll .................. 250/227.19 |
| 5,285,675 A | 2/1994 | Colgate et al. .............. 73/23.2 |
| 5,357,486 A | 10/1994 | Pearce ........................ 367/159 |
| 5,367,911 A | 11/1994 | Jewell et al. ............ 73/861.08 |
| 5,398,542 A | 3/1995 | Vasbinder .................... 73/40.5 |

(Continued)

FOREIGN PATENT DOCUMENTS

FR 2725787 4/1996

(Continued)

OTHER PUBLICATIONS

Sonar-Based Volumetric Flow Meter for Pulp and Paper Applications—By: Daniel L. Gysling & Douglas H. Loose—Dec. 3, 2002.

(Continued)

*Primary Examiner*—Harshad Patel

(57) ABSTRACT

An apparatus measures the speed of sound and/or vortical disturbances propagating in a fluid flow to determine a parameter of the flow propagating through a pipe. The apparatus includes a sensing device that includes an array of pressure sensors used to measure the acoustic and convective pressure variations in the flow to determine a desired parameter. The sensing device includes a unitary strap having a plurality of bands disposed parallel to each other. The bands are interconnected by cross members to maintain the bands a predetermined distance apart. Each of the bands having a strip of piezoelectric film material mounted along a substantial length of the bands. The piezoelectric film material provides a signal indicative of the unsteady pressures within the pipe. The sensing device includes a conductive shield around the multi-band strap and the piezoelectric film material to provide a grounding shield.

45 Claims, 17 Drawing Sheets

U.S. PATENT DOCUMENTS

| | | | |
|---|---|---|---|
| 5,524,475 A | 6/1996 | Kolpak et al. | 73/19.03 |
| 5,526,844 A | 6/1996 | Kamen et al. | 137/614.11 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,016,702 A | 1/2000 | Maron | 73/705 |
| 6,151,958 A | 11/2000 | Letton et al. | 73/61.79 |
| 6,202,494 B1 | 3/2001 | Riebel et al. | 73/861.29 |
| 6,354,147 B1 * | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,443,226 B1 | 9/2002 | Diener et al. | 166/241.6 |
| 6,450,037 B1 | 9/2002 | McGuinn et al. | 73/705 |
| 6,463,813 B1 | 10/2002 | Gysling | 73/862.59 |
| 6,536,291 B1 | 3/2003 | Gysling et al. | 73/861.42 |
| 6,550,342 B1 | 4/2003 | Croteau et al. | 73/800 |
| 6,558,036 B1 | 5/2003 | Gysling et al. | 374/147 |
| 6,587,798 B1 | 7/2003 | Kersey et al. | 702/50 |
| 6,601,458 B1 | 8/2003 | Gysling et al. | 73/861.04 |
| 6,609,069 B1 | 8/2003 | Gysling | 702/48 |
| 6,691,584 B1 | 2/2004 | Gysling et al. | 73/861.42 |
| 6,698,297 B1 | 3/2004 | Gysling | 73/861.63 |
| 6,732,575 B1 | 5/2004 | Gysling et al. | 73/61.79 |
| 6,782,150 B1 | 8/2004 | Davis et al. | 385/12 |
| 6,813,962 B1 | 11/2004 | Gysling et al. | 73/861.26 |
| 6,837,098 B1 | 1/2005 | Gysling et al. | 73/61.79 |
| 6,862,920 B1 | 3/2005 | Gysling et al. | 73/61.79 |
| 6,868,737 B1 | 3/2005 | Croteau et al. | 73/800 |
| 6,889,562 B1 | 5/2005 | Gysling et al. | 73/861.42 |
| 6,898,541 B1 | 5/2005 | Gysling et al. | 702/100 |
| 2002/0100327 A1 | 8/2002 | Kersey et al. | |
| 2002/0123852 A1 | 9/2002 | Gysling et al. | |
| 2002/0129662 A1 | 9/2002 | Gysling et al. | |
| 2003/0038231 A1 | 2/2003 | Davis et al. | |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2004/0016284 A1 | 1/2004 | Gysling et al. | |
| 2004/0069069 A1 | 4/2004 | Croteau et al. | |
| 2004/0074312 A1 | 4/2004 | Gysling | |
| 2004/0144182 A1 | 7/2004 | Gysling et al. | |
| 2004/0167735 A1 | 8/2004 | Gysling et al. | |
| 2004/0168522 A1 | 9/2004 | Bailey et al. | |
| 2004/0168523 A1 | 9/2004 | Bailey et al. | |
| 2004/0199341 A1 | 10/2004 | Gysling et al. | |
| 2004/0210404 A1 | 10/2004 | Gysling et al. | |
| 2004/0226386 A1 | 11/2004 | Croteau et al. | |
| 2004/0255695 A1 | 12/2004 | Gysling et al. | |

FOREIGN PATENT DOCUMENTS

| | | |
|---|---|---|
| GB | 2282931 | 4/1995 |
| WO | WO 93/14382 | 7/1993 |
| WO | WO 99/067629 | 12/1999 |
| WO | WO 00/060317 | 10/2000 |
| WO | WO 01/002810 | 1/2001 |

OTHER PUBLICATIONS

Sonar Based Volumetric Flow Meter for Chemical and Petrochemical Applications—By: Daniel L. Gysling & Douglas H. Loose—Feb. 14, 2003.

Sonar Based Volumetric Flow and Entrained Air Measurement for Pulp and Paper Applications—By: Daniel L. Gysling & Douglas H. Loose—Jan. 24, 2003.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul., 1996, pp. 67-94.

"New Flowmeter Principle"—By: Walt Boyes—Published in Flow Control Magazine—Oct. 2003 Issue.

"Piezoelectric Polymers"—By: J.S. Harrison and Z. Ounaies—ICASE Report.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

* cited by examiner

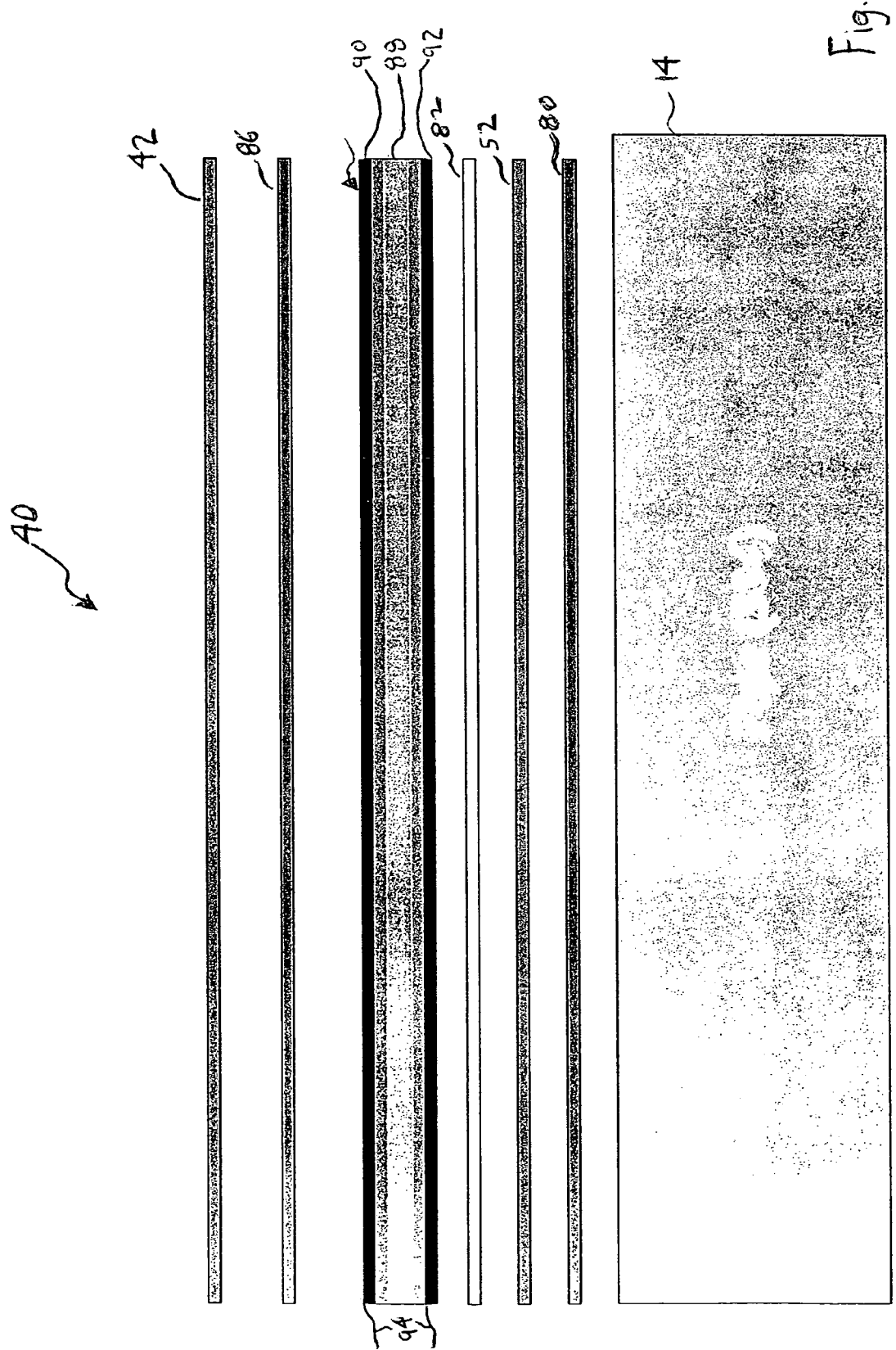

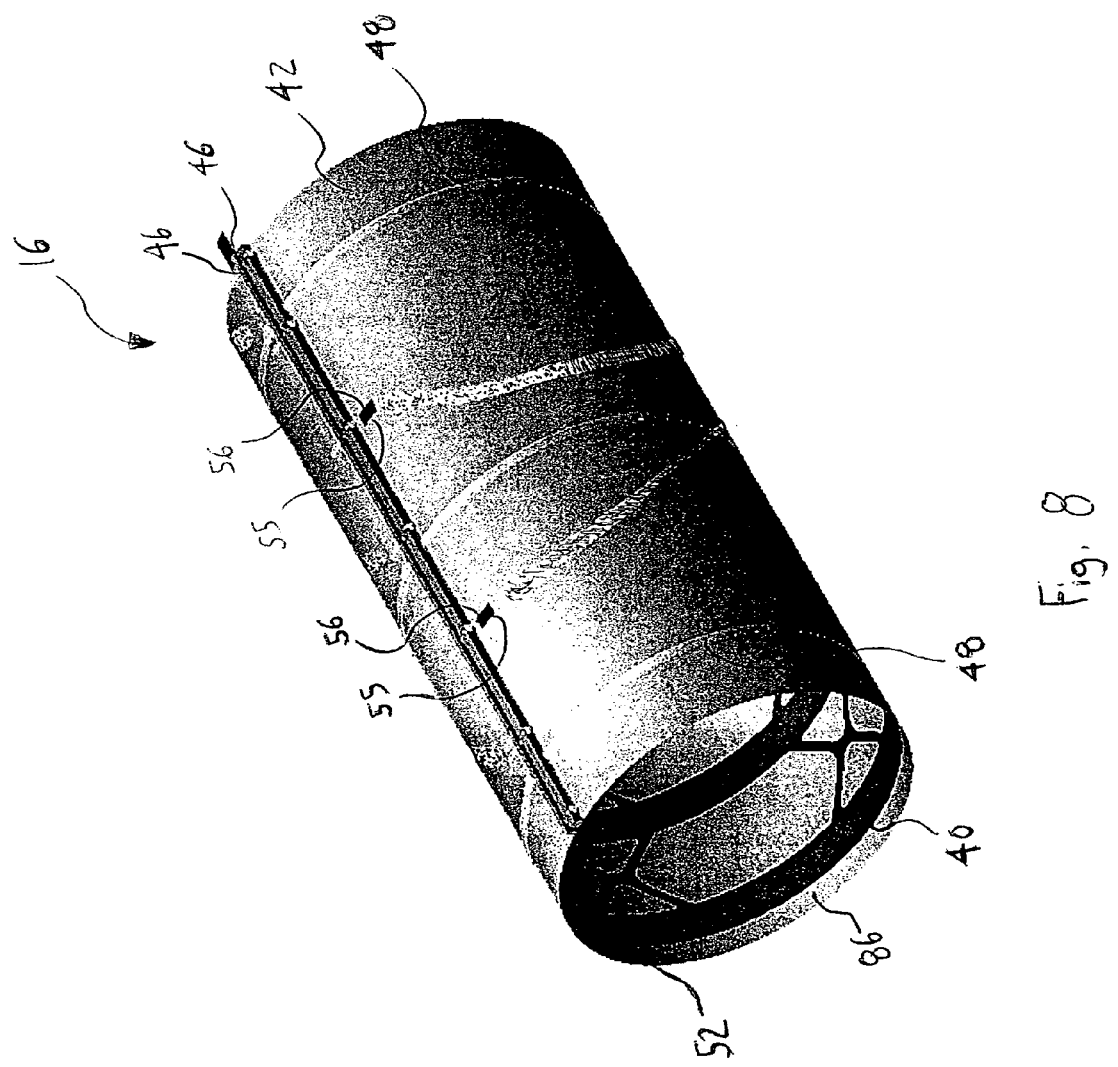

APPARATUS HAVING A MULTI-BAND SENSOR ASSEMBLY FOR MEASURING A PARAMETER OF A FLUID FLOW FLOWING WITHIN A PIPE

CROSS-REFERENCE TO RELATED APPLICATIONS

This patent application claims the benefit of U.S. Provisional Patent Application No. 60/451,685, filed on Mar. 4, 2003, which is incorporated herein by reference.

TECHNICAL FIELD

This invention relates to an apparatus for measuring a parameter or characteristic of a process fluid flowing within a pipe, and more particularly, an apparatus having an array of pressure sensors that clamp onto the outer surface of a pipe to determine a parameter or characteristic of a process fluid with in a pipe.

BACKGROUND ART

Numerous technologies have been implemented to measure volumetric and other parameters and characteristics of a fluid flowing within a pipe. A majority of these meters are intrusive to the flow. For instance, vortex meters, orifice plates and differential meters place device directly in the flow. These meters have limited applications that are specific to the kind of fluid flowing through the pipe. Further is some instances the reliability and life of the meter can be greatly reduced, depending on the type of fluid flow. For example, a very abrasive flow may wear down or damage elements of the meter, which are directly exposed to the flow.

Another disadvantage of these in-flow meters is that in order to replace or install the meter, the process or flow loop must be shutdown. This shutdown can be costly and a time-consuming process. Some of these meters can be very large and heavy making the installation process very difficult and some times requiring more than one individual to install.

It would advantageous to have a meter that is small and lightweight that can be clamped onto the outside of the pipe. Such a meter allows the meter to be easily installed and doesn't require the flow process to be shutdown during installation.

This invention provides an apparatus to measure homogeneous and/or non-homogeneous fluids used in industrial systems having various working fluids to determine various parameters of the process fluid, such as the volumetric flow of the fluid, the gas volume fraction, and the size of particle flowing through the fluid.

Here a novel approach to flow measurements is proposed which utilizes a non-intrusive, externally mounted sensing element that requires no moving parts and is highly reliable. This approach is based upon array processing unsteady pressure measurements induced in an array of externally mounted sensors. The array of sensors are attached to a multi-band sensor strap to allow the spacing of the sensors to be set during manufacturing to provide quick installation and accurate spacing of the sensors.

SUMMARY OF THE INVENTION

Objects of the present invention include an apparatus for measuring the unsteady pressures of fluid flow in a pipe to determine a parameter of the flow, wherein the apparatus includes a plurality of pressure sensors attached to a unitary strap to enable the easy clamping of the sensors to the outer surface of the pipe.

According to the present invention, a sensing device for measuring a parameter of a process flow flowing within a pipe includes a strap having at least two bands. The bands are interconnected to provide a predetermined spacing therebetween. At least two pressure sensors comprise piezoelectric film material. Each of the pressure sensors is mounted to a respective band of said strap, wherein the pressure sensors provide respective pressure signals indicative of the unsteady pressure within the pipe. A fastener secures the strap around the outer surface of the pipe.

According to the present invention, an apparatus for measuring a parameter of a process flow flowing within a pipe includes a sensor device for measuring unsteady pressures within the pipe. The sensor device includes a strap having at least two bands, wherein the bands are interconnected to provide a predetermined spacing therebetween. At least two pressure sensors comprise piezoelectric film material. Each of the pressure sensors are mounted to a respective band of said strap, wherein the pressure sensors provide respective pressure signals indicative of the unsteady pressure within the pipe. A fastener secures the strap around the outer surface of the pipe. A processing unit determines the parameter of the process flow in response to the pressure signals.

The foregoing and other objects, features and advantages of the present invention will become more apparent in light of the following detailed description of exemplary embodiments thereof.

BRIEF DESCRIPTION OF THE DRAWINGS

FIG. 6 is a perspective view of a partially assembled portion of the multi-band sensor assembly of FIG. 4, in accordance with the present invention.

FIG. 7 is an enlarged, exploded view of a portion of the multi-band sensor assembly of FIG. 4, in accordance with the present invention.

FIG. 8 is a prespective view of an assembled multi-band sensor assembly of FIG. 4, in accordance with the present invention.

BEST MODE FOR CARRYING OUT THE INVENTION

Figure 1:
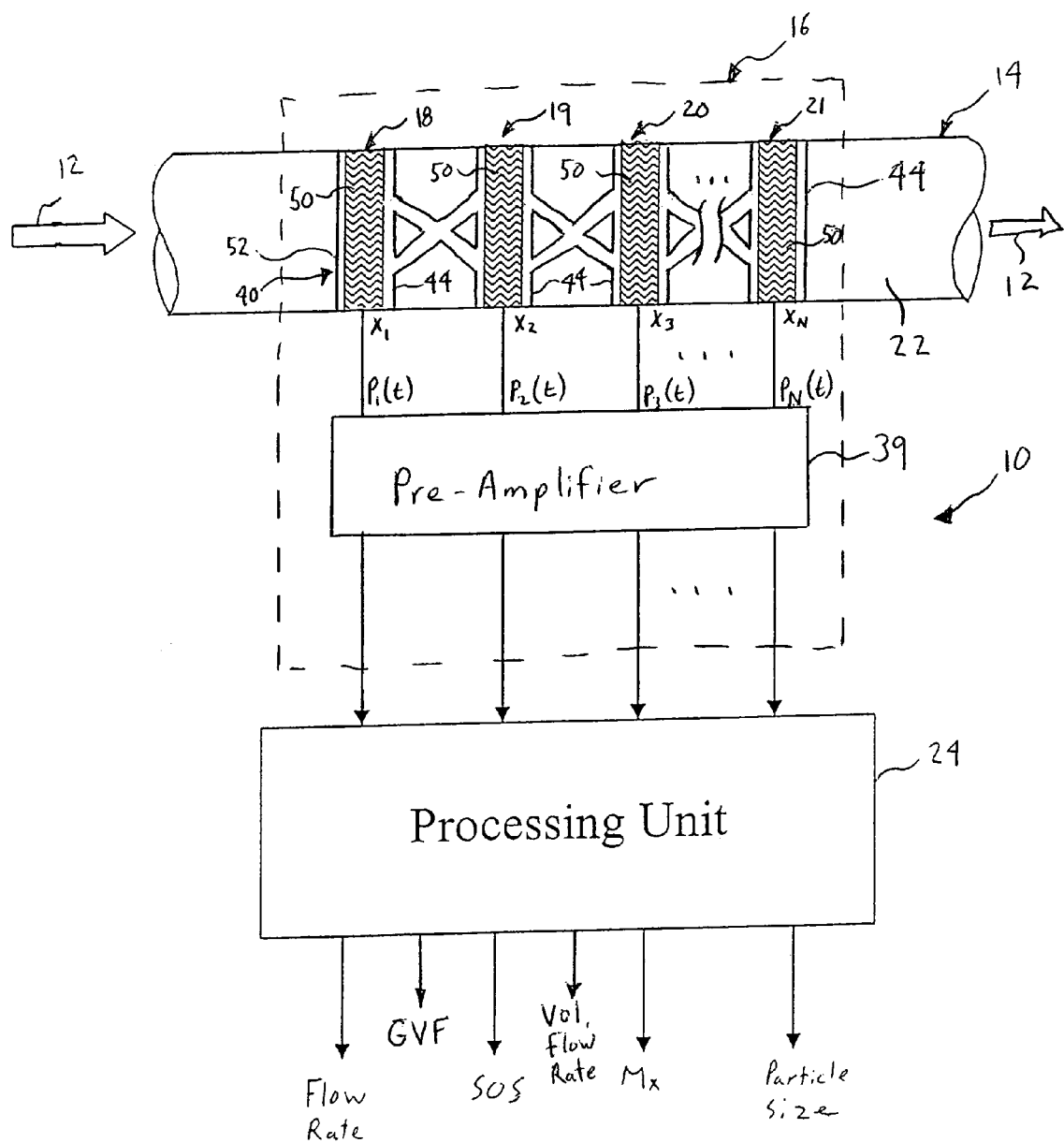
FIG. 1 is a schematic view of an apparatus for measuring and processing the unsteady pressures of a fluid flowing through a pipe, in accordance with the present invention.

Referring to FIG. 1, an apparatus, generally shown as 10, is provided to measure the unsteady pressures ($P_{(\omega)}$) of a fluid or mixture 12 flowing within a conduit or pipe 14 and process the measured unsteady pressure to determine a parameter or characteristic of the fluid. The apparatus 10 measures a characteristic or parameter of a single phase fluid flow (e.g., gas and liquid) and/or multiphase fluids (e.g., gas/liquid mixtures, liquid/solid mixtures, gas/solid mixtures, steam, pulp and paper slurries, aerated gas and liquids and mixtures) flowing through a pipe 14. Specifically, the characteristics and parameters determined include the volumetric flow of the fluid, the consistency or composition of the fluid, the density of the fluid, the Mach number of the fluid, the size of particle flowing through the fluid, the air/mass ratio of the fluid, velocity of the flow, volumetric flow rate, and/or the percentage of entrained air within a liquid or slurry.

For instance, the apparatus 10, in accordance with the present invention, can determine the speed at which sound propagates through the fluid flow 12 within a pipe 14 to measure particular characteristics of the single or multiphase fluids. The apparatus may also determine the speed at which vortical disturbances or turbulent eddies 188 (see FIG. 12) propagated through the pipe 14 to determine the velocity of the fluid flow 12. To simplify the explanation of the present invention, the flow propagating through the pipe will be referred to as a fluid flow with the understanding that the flow or fluid flow 12 may be a single phase or multiphase flow, as described hereinbefore.

The apparatus 10 includes a clamp-on sensing device 16 (or sensor head) comprising an array of at least two pressure sensors 18,19 spaced axially along the outer surface 22 of a pipe 14, having a process flow propagating therein. The array of sensors of the sensing unit 16 may include any number of pressure sensors 18–21, such as eight, sixteen and N number of sensors. Generally, the accuracy of the measurement improves as the number of sensors in the array increases. The pressure sensors 18–19 measure the unsteady pressures produced by acoustical and/or vortical disturbances within the pipe 14, which are indicative of the SOS propagating through the fluid flow 12 in the pipe and the velocity of the mixture 12, respectively. The output signals ($P_1(t)$–$P_N(t)$) of the pressure sensors 18–21 are provided to a pre-amplifier unit 39 that amplifies the signals generated by the pressure sensors 18–21. The processing unit (or transmitter) 24 processes the pressure measurement data $P_1(t)$–$P_N(t)$ and determines the desired parameters and characteristics of the flow 12, as described hereinbefore.

As will be described in greater detail hereinafter, the apparatus 10 has the ability to measure the speed of sound (SOS) and flow rate (or velocity) using one or both of the following techniques described herein below:

1) Determining the speed of sound of acoustical disturbances or sound waves propagating through the flow 12 using the array of pressure sensors 18–21, and/or
2) Determining the velocity of vortical disturbances or "eddies" propagating through the flow 12 using the array of pressure sensors 18–21.

Generally, the first technique measures unsteady pressures created by acoustical disturbances propagating through the flow 12 to determine the speed of sound (SOS) propagating through the flow. Knowing the pressure and/or temperature of the flow and the speed of sound of the acoustical disturbances, the processing unit 24 can determine determined include the volumetric flow of the fluid, the consistency or composition of the fluid, the density of the fluid, the Mach number of the fluid, the size of particle flowing through the fluid, the air/mass ratio of the fluid, and/or the percentage of entrained air within a liquid or slurry, such as that described in U.S. patent application Ser. No. 10/349,716, filed Jan. 23, 2003, U.S. patent application Ser. No. 10/376,427, filed Feb. 26, 2003, U.S. patent application Ser. No. 10/762,410, filed Jan. 21, 2004, which are all incorporated by reference.

Figure 12:
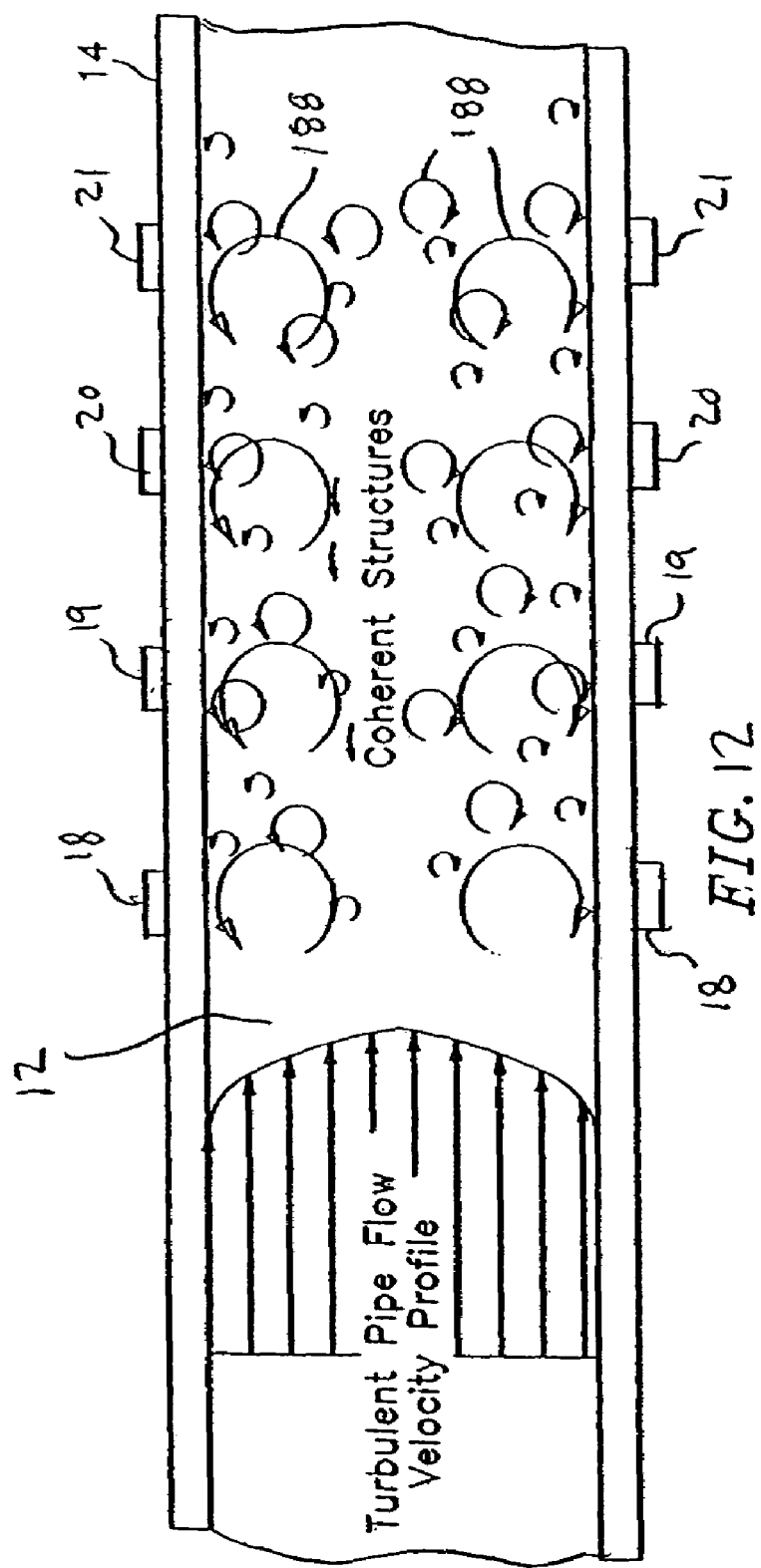
FIG. 12 is a cross-sectional view of a pipe having a turbulent pipe flowing having coherent structures therein, in accordance with the present invention.

The second technique measures the velocities associated with unsteady flow fields and/or pressure disturbances created by vortical disturbances or "eddies" 118 (see FIG. 12) to determine the velocity of the flow 12. The pressure sensors 18–21 measure the unsteady pressures $P_1$–$P_N$ created by the vortical disturbances as these disturbances convect within the flow 12 through the pipe 14 in a known manner, as shown in FIG. 12. Therefore, the velocity of these vortical disturbances is related to the velocity of the flow 12 and hence the volumetric flow rate may be determined, as will be described in greater detail hereinafter.

As shown in FIG. 1, each of the pressure sensors 18–21 include a piezoelectric film 50 attached to a unitary multiband strap 52 to measure the unsteady pressures of the flow 12 using either technique described hereinbefore. The piezoelectric film sensors 18–21 are mounted onto a unitary substrate or web 52 which is mounted or clamped onto the outer surface 22 of the pipe 14, which will described in greater detail hereinafter.

The piezoelectric film sensors 18–21 include a piezoelectric material or film 50 to generate an electrical signal proportional to the degree that the material is mechanically deformed or stressed. The piezoelectric sensing element 50 is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc. While the piezoelectric film material 50 is provided substantially the length of the band 44, and therefore the circumference of the pipe 14, the present invention contemplates that the piezoelectric film material may be disposed along a portion of the band of any length less than the circumference of the pipe.

Piezoelectric film ("piezofilm") 50, like piezoelectric material, is a dynamic material that develops an electrical charge proportional to a change in mechanical stress. Consequently, the piezoelectric material measures the strain induced within the pipe 14 due to unsteady or stochastic pressure variations (e.g., vortical and/or acoustical) within the process flow 12. Strain within the pipe is transduced to an output voltage or current by the attached piezoelectric sensor 18–21. The piezoelectrical material or film 50 may be formed of a polymer, such as polarized fluoropolymer, polyvinylidene fluoride (PVDF). The piezoelectric film sensors are similar to that described in U.S. patent application Ser. No. 10/712,818, filed Nov. 12, 2003, which is incorporated herein by reference.

The advantages of this clamp-on technique using piezoelectric film include non-intrusive flow rate measurements, low cost, measurement technique requires no excitation source. Ambient flow noise is used as a source. Further, the flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.

Figure 2:
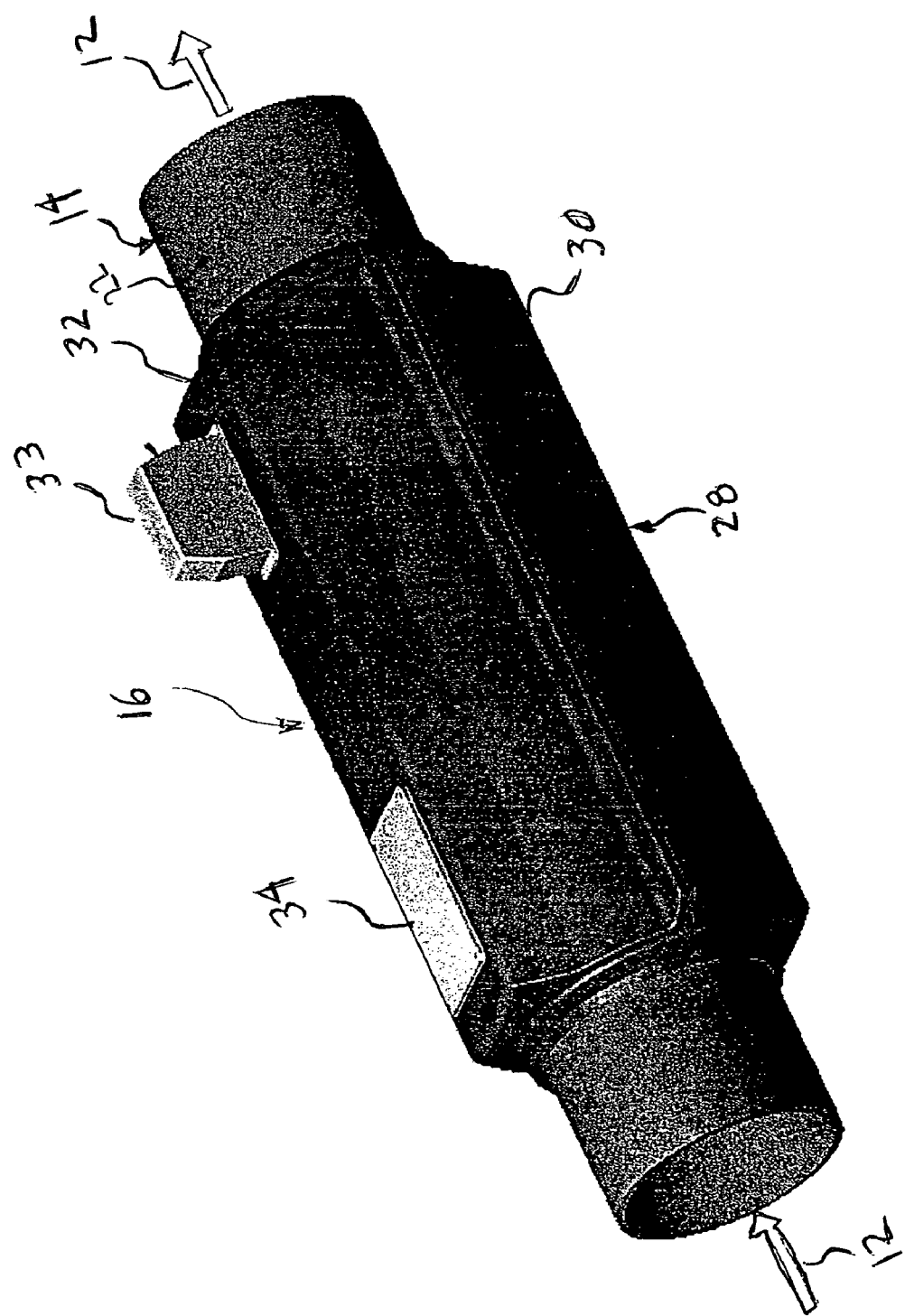
FIG. 2 is a perspective view of a sensor head assembly of the apparatus of FIG. 1, in accordance with the present invention.
Figure 3:
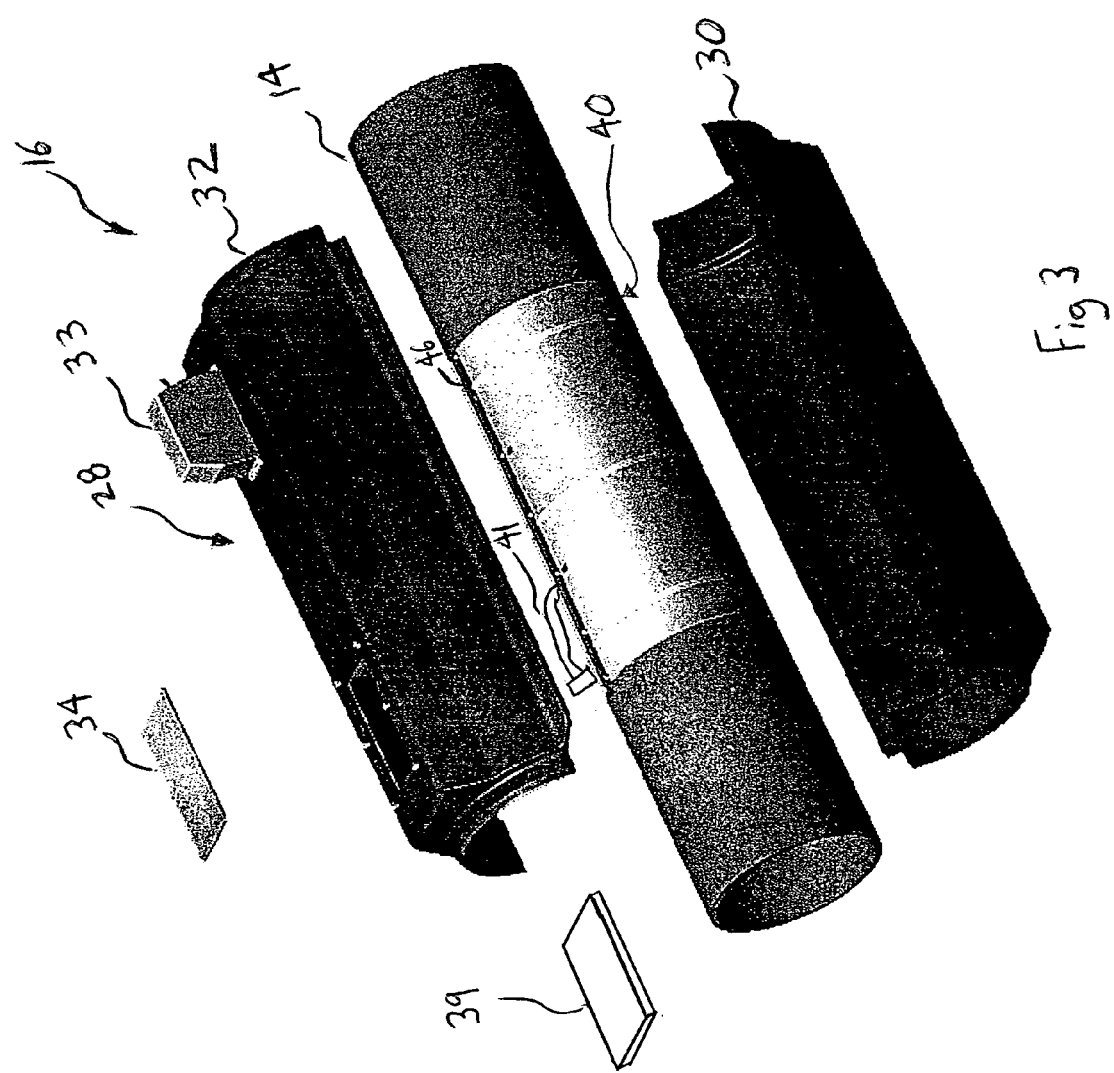
FIG. 3 is an exploded view of the sensor head of FIG. 2, in accordance with the present invention.

FIGS. 2 and 3 show an embodiment of the sensing device 16 (or sensor head) mounted to a pipe 14 having fluid 12 flowing therethrough. The sensor head 16 includes a multi-band sensor assembly 40, a pre-amplifier unit 39 and a cover 28. The sensor assembly 40 is wrapped and mounted to the outer surface 22 of the pipe 14. The cover comprises a lower portion 30 and an upper portion 32, which are clamped around the sensor assembly 40 and a portion of the pipe 14 and secured together, such as by bolts, clamps, latches or other attachment means. The cover 28 provides acoustic and environmental insulation for the sensor assembly 40. The pre-amplifier unit 39 is mounted on the inside of the upper cover 32 and is electrically connected to the sensor assembly 40 by a cable 41, such as a tribor cable, which reduces the generation of static electricity when bent or compressed during installation and operation of the apparatus 10. The pre-amplifier unit amplifies the signals $P_1(t)$–$P_N(t)$ provided by the piezoelectric sensors 18–21. The amplified signals are provided to the processing unit (or transmitter box) 24 through a connector 33, such as NEMA 4× rated industrial connector and cable (not shown). An access cover 34 disposed in the upper portion 32 of the cover 28 provides access to the pre-amplifier unit 39 to enable the connection of the cable 41 extending from the sensor assembly 40 to the pre-amplifier unit. The cover 28 may be formed of a polymer material, fiber glass material, metal (e.g., stainless steel) or other structural material. The present invention also contemplates having a metallic mesh, screen or sheet material embedded in the cover and grounded to provide shielding from electromagnet fields (EMF). A gasket (not shown) is also disposed around a periphery of each cover portion to provide a seal around the edges of the cover to prevent water and other elements from entering into the cover 28. The gasket may be formed of polymeric material, such as Teflon®.

Figure 4:
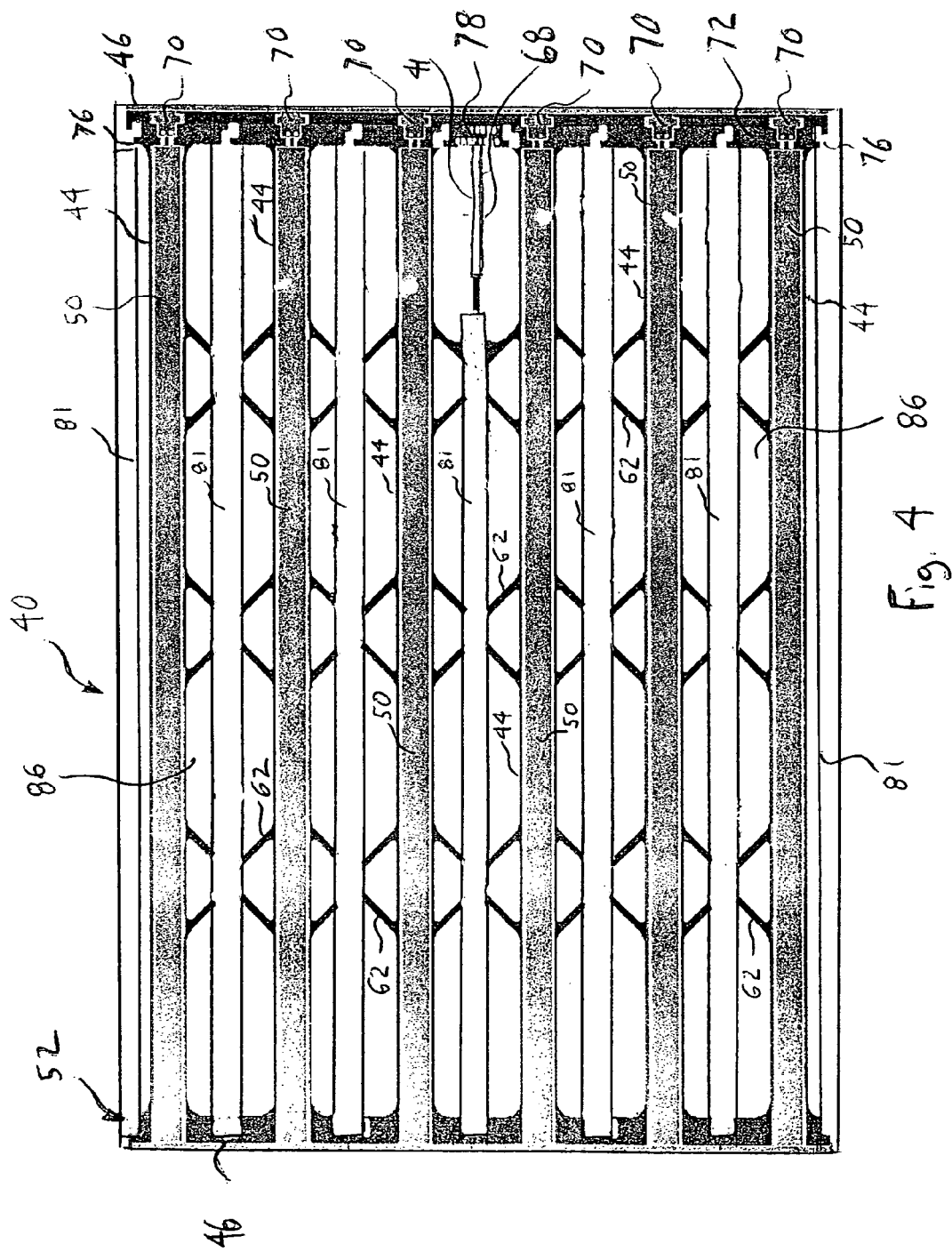
FIG. 4 is top plan view of a portion of the multi-band sensor assembly, in accordance with the present invention.
Figure 5:
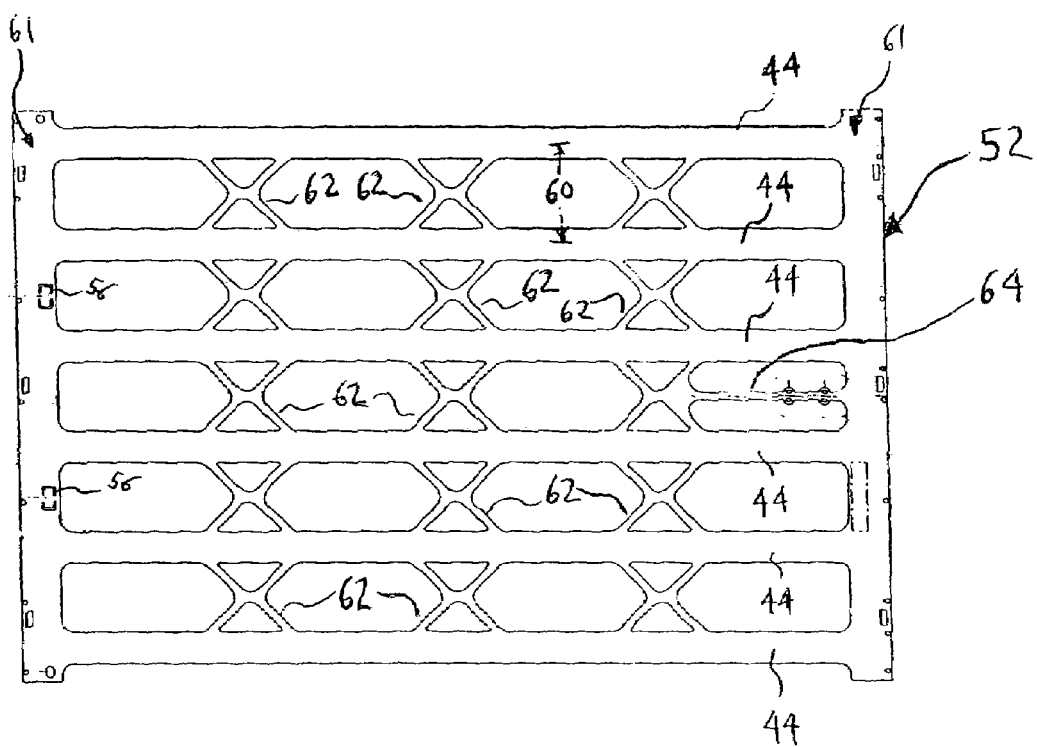
FIG. 5 is a top plan view of a unitary multi-band strap of the multi-band sensor assembly of FIG. 4, in accordance with the present invention.

Referring to FIGS. 4 and 5, the multi-band sensor assembly 40 of the sensor head 16 includes a strip of piezoelectric film 50 attached to each band 44 of a multi-band strap 52 (best shown in FIG. 5). The multi-band strap 52 is formed of a single sheet of metallic material (e.g., stainless steel) by stamping or punching voids into the sheet material. The multi-band strap 58 includes a plurality of bands 44 that are spaced a predetermined distance apart. In the embodiment shown, the bands are equi-spaced, however, the present invention contemplates that the straps may be disposed at different spacings. In one embodiment, the spacing is approximately 40% of the diameter of the pipe 14.

The type of unsteady pressure measurement being made (SOS v. Vortical Disturbances) determines the spacing of the sensors 18–21. Measurement of unsteady vortical pressures prefers the array of sensors to be spaced such that the length of the array is less than the coherence length of the vortical disturbances which is typically on the order of a pipe diameter. Measurement of the acoustic pressures prefers the array of sensors to be space such that the length of the array of sensors 18–21 is as long as a predetermined portion of the wavelength of the measured acoustic signal (e.g., greater than 20% of the wavelength of the acoustic signal). The desired wavelength of the measured acoustic signal is dependent upon the dispersion of particles in the fluid flow, which is dependent on the particle size, such as that described in U.S. patent application Ser. No. 10/349,716, filed Jan. 23, 2003, U.S. patent application Ser. No. 10/376,427, filed Feb. 26, 2003, U.S. patent application Ser. No. 10/762,410, filed Jan. 21, 2004, which are all incorporated by reference.

The multi-band strap 52 also includes a plurality of cross members 62 spaced along the length of the bands 44 to maintain the spacing between the bands over their lengths. The respective ends of the bands are also interconnected by opposing end strips 61. The cross members 62 are formed in the shape of an X, however, the invention contemplates that the cross members may be in the form of straight members extending perpendicular between the bands 44 or diagonal to the bands. These diagonal members may be angled in the same direction or different directions. The cross members 62 advantageously provide that the sensors are properly spaced apart and maintained at the proper distance during the mounting of the sensor assembly 40 to the outer surface 22 of the pipe 14. The interconnection of the bands 44 also permits all the sensors 18–21 to be mounted to the pipe 14 simultaneously and thus reduces the time of mounting the sensor assembly 16 to the pipe. The unitary multi-band strap 52 ensures the sensors 18–21 are properly space.

The present invention also contemplates the multi-band strap 52 may simply comprise a single sheet of metallic material without cut outs to define individual bands 44, however, when mounted to the pipe, the sheet may not uniformally contact the surface 22 of the pipe.

Referring to FIGS. 4 and 6, each piezoelectric film 50 is mounted, which will be described in greater detail hereinafter, along the length of a respective band 44 of the sensor strap 52. The electrodes 70 of each piezoelectric film 50 are electrically connected (e.g., soldered) to a flexible circuit board 72 mounted along the length at one end strip 61 of the multi-band strap 52. The circuit board 72 is secured to the multi-band strap 52 by a plurality of tabs 76 that are welded or otherwise attached to the multi-band strap. The piezoelectric film 50 wraps from below the circuit board 72 to the top of the circuit board, where it is soldered thereto. The electrical runs on the circuit board 72 interconnect each piezoelectric film 50 to the electrical cable 66 at location 78. The electrical cable 41 interconnects with the pre-amplifier unit 39 adjacent the access window of the cover 28 (see FIG. 3).

Referring to FIGS. 4 and 6, the multi-band sensor assembly 40 is wrapped around the pipe 14 and the ends are attached to each other by a pair of stiffening rails 46. The stiffening rails 46 are attached (e.g., welded) to the ends of the multi-band strap 52 of the sensor assembly 40. The rails 46 extend the length of the end strips 61 of the multi-band strap 52. As shown, the ends of the multi-band strap 52 are bend to engage the inner surface of the rails 46. The bent ends of the multi-band strap 52 are then welded to the inner surface of each respective rod 46. While the multi-band strap 52 is welded to the rails, other fastening means may be used, such as bolts and screws.

Figure 9:
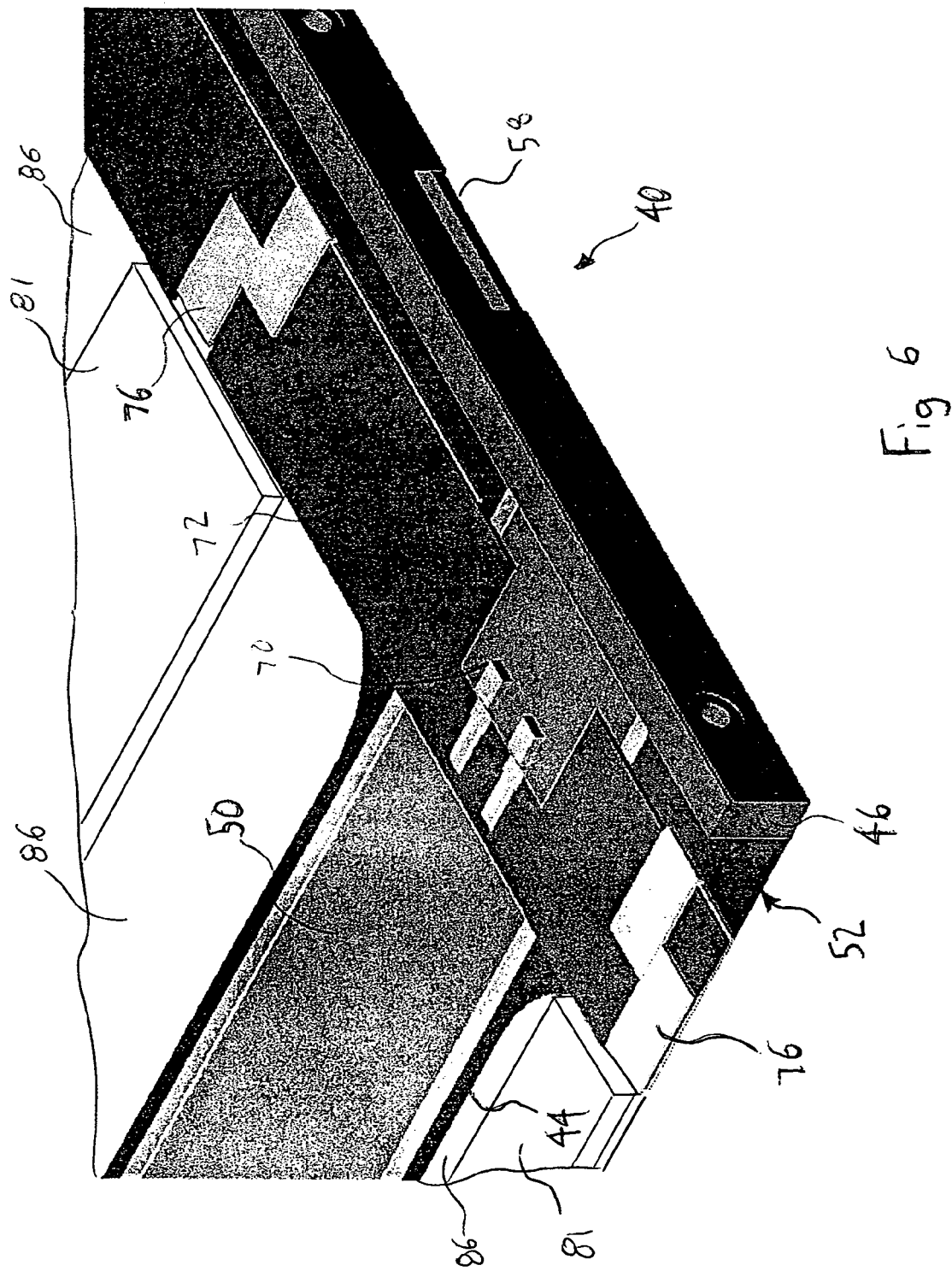
FIG. 9 is a partial perspective view of an assembled multi-band sensor assembly of FIG. 4, in accordance with the present invention.
Figure 9:
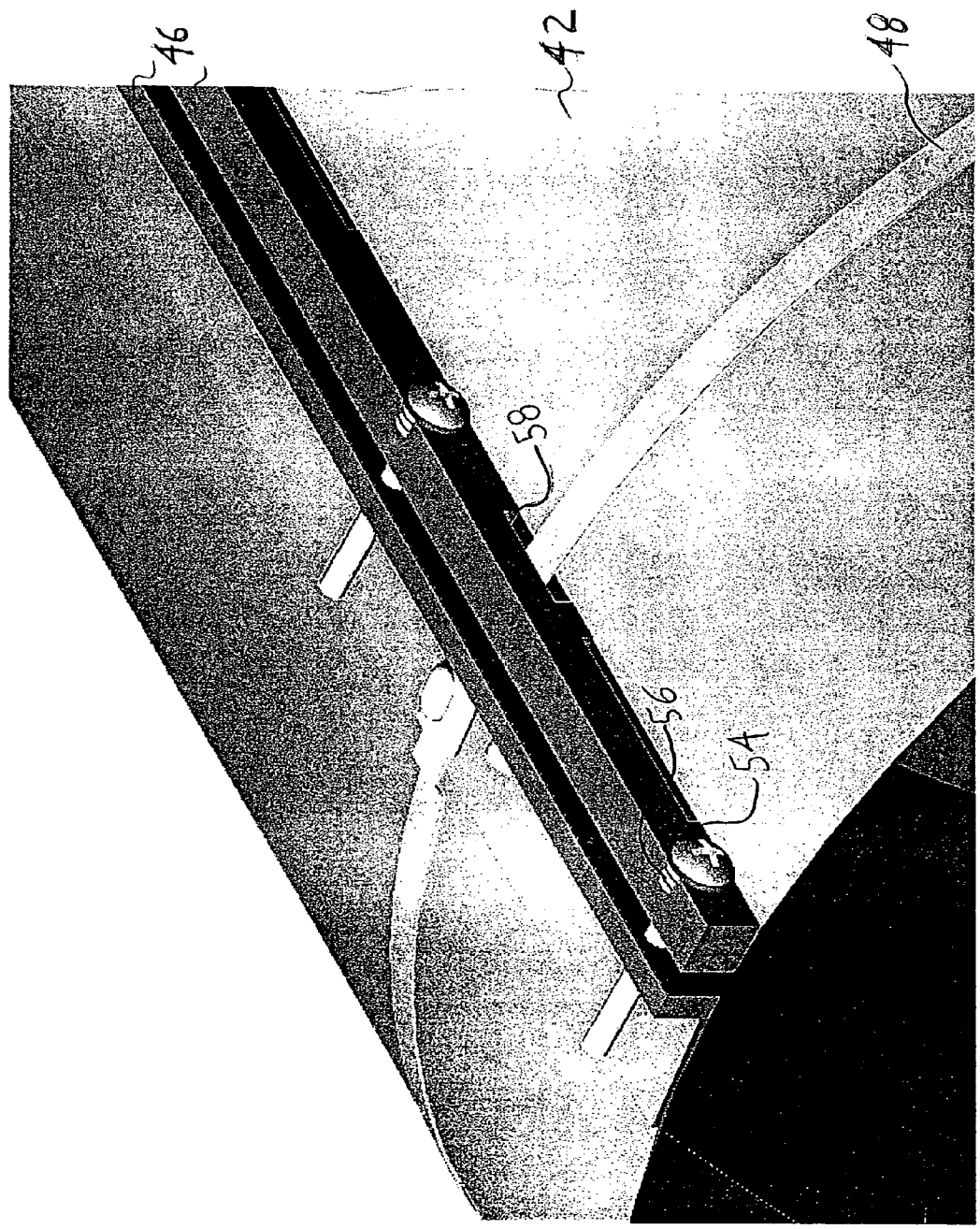

When mounting or clamping the sensor assembly 40 to the pipe 14, the ends of the sensor assembly 40 are secured together by bolts or screws 54, or other fasteners, which interconnect the stiffening rods 46. To insure proper alignment of the rails 46, one rail may include a guide pin and the other rail a hole for receiving the pin. As best shown in FIG. 9, a spring 56 may be disposed on the bolts to provide constant tension on the rails 46.

While the rails 46 are shown to be one continuous rail, the present invention contemplates that each rail may comprise a plurality of shorter rails disposed at the end of each band 44, effective providing a split rail. Similar to that described, each of the shorter rails opposing each other are bolted together to secure the sensor assembly 40 to the pipe 14. This split rail (i.e., plurality of shorter rails) configuration isolates each band 44 from the others an thus permits each band 44 to more uniformly engage the pipe 14 with out the stress and influence of the clamping of the other bands created by the single unitary rail 46.

As shown in FIGS. 8 and 9, the sensor assembly 40 includes a shield 43, dispose around the outside of the multi-band strap 52 to provide a grounding shield. The grounding shield may comprise metallic sheet material, screen or web. In one embodiment, the shield 42 is attached to the sensor assembly 40 by welding one end of the shield to one end of multi-band strap 52. The shield 42 wraps around the sensor assembly 40 to the opposing end thereof. The opposing end of the shield 42 includes a pair of through holes or windows 55 for receiving bend tabs 56, which are integral to the multi-band strap 52. The bend tabs temporarily support the shield in place to enable the attachment of the cable ties 48 around the shield. As best shown in FIGS. 6, 8 and 9, the stiffening rails 46 includes channels 58 to allow the cable ties 48 to pass therethrough.

As shown in FIGS. 8 and 9, the shield 42 is clamped over the multi-band sensor assembly 40 (see FIG. 3) by a plurality of cable ties 48. The shield 42 and cable ties 48 may be formed of stainless steel, or any other suitable material. The shield protects the sensor assembly 40 and functions to provide an electrical or ground shield for the sensors of the sensor assembly.

The shield 42 is attached by welding one end of the shield to one end of strap 52 of the sensor assembly 40. The shield 42 wraps around the sensor assembly 40 to the opposing end of the sensor assembly. The opposing end of the shield 42 includes a pair of through holes or windows 55 for receiving bend tabs 56, which are integral to the multi-band strap 52. The bend tabs temporarily support the shield in place to enable the attachment of the cable ties 48 around the shield. The stiffening rods 46 includes channels 58 to allow the cable ties 48 to pass therethrough. FIG. 5 illustrates the bend tabs 56 that are formed by two opposing U-shaped channels 63. During assembly of the sensor assembly 16, the tabs 56 are bent upwards, passed through respective windows 55 of the shield 42 and flattened again to temporarily support the free end of the shield while the cable ties 48 and secured around the shield.

In a addition to the metallic grounding shield 46, a sheet of polyimide material 86 or other suitable non-conductive material is secured to the inner surface of grounding shield, such as by rivets. The polyimide material 86 (e.g., Kapton) provides an electrically insulative barrier between the piezoelectric film and the shield 46. Further, the polyimide material provides a water barrier for the piezoelectric film 50 should any water or moisture pass through the shield 46, particularly shield in the form of a screen or web.

Alternatively, the shield 46 may be secured, such as by welding to both ends of the multi-band strap 52. This method is particularly suited for shields that are in the form of a web or screen, and therefore flexible.

Referring to FIG. 4, the sensor assembly 40 includes a plurality of stand-offs 81 disposed at the outer edges of the multi-band strap 51 and between each of the bands 44. The stand-offs extend substantially the length of the bands 44. The stand-offs are formed of a flexible foam-like material having a thickness great than the thickness of the piezoelectric film 50 to ensure the shield 46 and polyimide sheet does not contact the piezoelectric film when the sensor assembly 40 is clamped/mounted onto a pipe 14.

FIG. 7 illustrates an exploded view of a portion of the sensor assembly 40 adjacent a pipe 14. Kapton tape 80 is adhered to the bottom surface of the multiband strap 52 of the stainless (S.S.) to provide electrical insulation between the pipe 14 and the multi-band strap. A VHB transfer tape 82 is used to adhere a piezoelectric film 50 (e.g., PVDF) to the upper portion of the band 44 of the sensor strap 52.

The piezoelectric film 50 comprises a piezofilm 88 disposed between a top electrode 90 and a bottom electrode 92, having respective conductor 94 extending therefore. The PVDF element is similar to that manufactured by Measurement Specialties, part no. DT4-028KP/N 1-1002150.

A second polyimide sheet (e.g., Kapton) 86 is adhered or attached to the inner surface of the shield 42 to provide additional electrical insulation between the shield and the piezoelectric film. The shield 42 is then wrapped around the sensor assembly 40, as described hereinbefore. Alternatively, a strip of copper tape (not shown) may be adhered to over the outer surface of the piezoelectric film 50 to provide a ground shield.

While the piezoelectric film 50 is shown disposed on the outer surface of the band 44 of the sensor strap 52, away from the pipe 14, the present invention contemplates that the piezoelectric film 50 may be disposed on the opposite, inner surface of the band 44.

FIGS. 4 and 5 illustrate a cable support 64 that extends from one end of the sensor strap 52 to a cross member 62. As best shown in FIG. 4, the electrical cable 66 connected to the piezoelectric film 50 is secured to the cable support 64 by a pair of tie wraps 68 to reduce strain on the interconnection of the electrical cable.

Advantageously, the single strap 40 having multiple bands 44, each of which having a PVDF sensor 50 mounted thereon, allows the sensor spacing to be set at the time of manufacture to thereby eliminate the positioning and measuring at the time of installation. Further, the single strap 40 allows more accurate positioning (spacing) of the sensors 18–21 than can be attained in a field installation. The single strap 52 also provides a more time efficient installation technique over installing individual bands 44.

While six sensors have been shown, one will appreciate that sensor assembly 40 may have any number of PVDF sensors 50, including as few as two sensors and more than six sensors, such as 8, 16 or more sensors.

Figure 10:
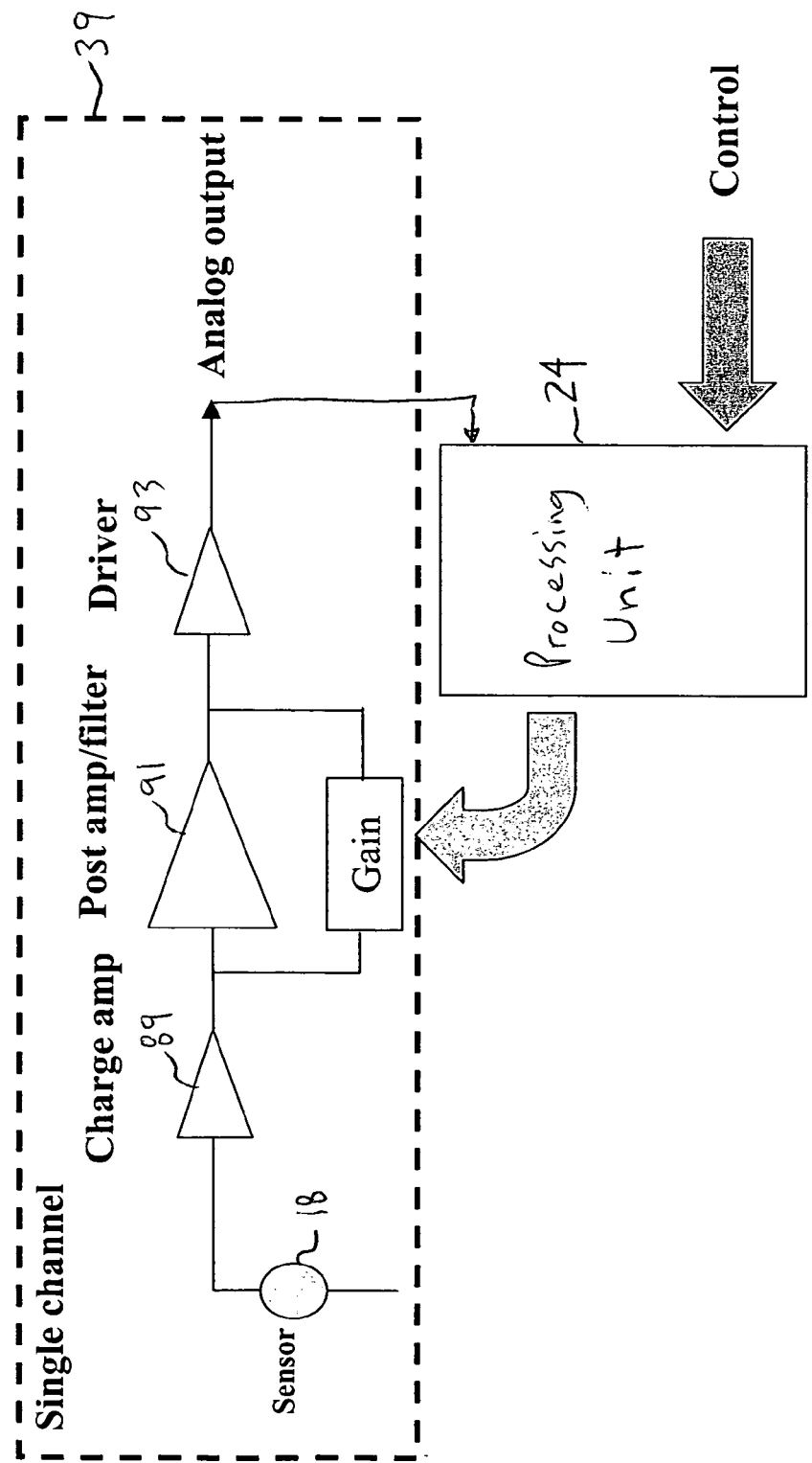
FIG. 10 is a block diagram of a single channel of a pre-amplifier unit o FIG. 1, in accordance with the present invention.

FIG. 10 shows a block diagram of a single channel of the pre-amplifier unit 39. Each pre-amplifier channel comprises a charge amplifier 89, a post amplifier filter 91 and an analog driver 93. The gain of the post-amplifier 89 is controlled by the processing unit 24 in response to a control signal 95 provided through software or manually.

As discussed hereinbefore, the apparatus 10 of FIG. 1 embodying the present invention includes the ability to measure volumetric flow rate of the mixture by measuring the unsteady pressures generated by vortical disturbances 188 propagating in the flow 12 (see FIG. 12). The apparatus 10 characterizes the convective ridge of the vortical disturbances 188 using the array of pressure sensors 18–21.

Figure 11:
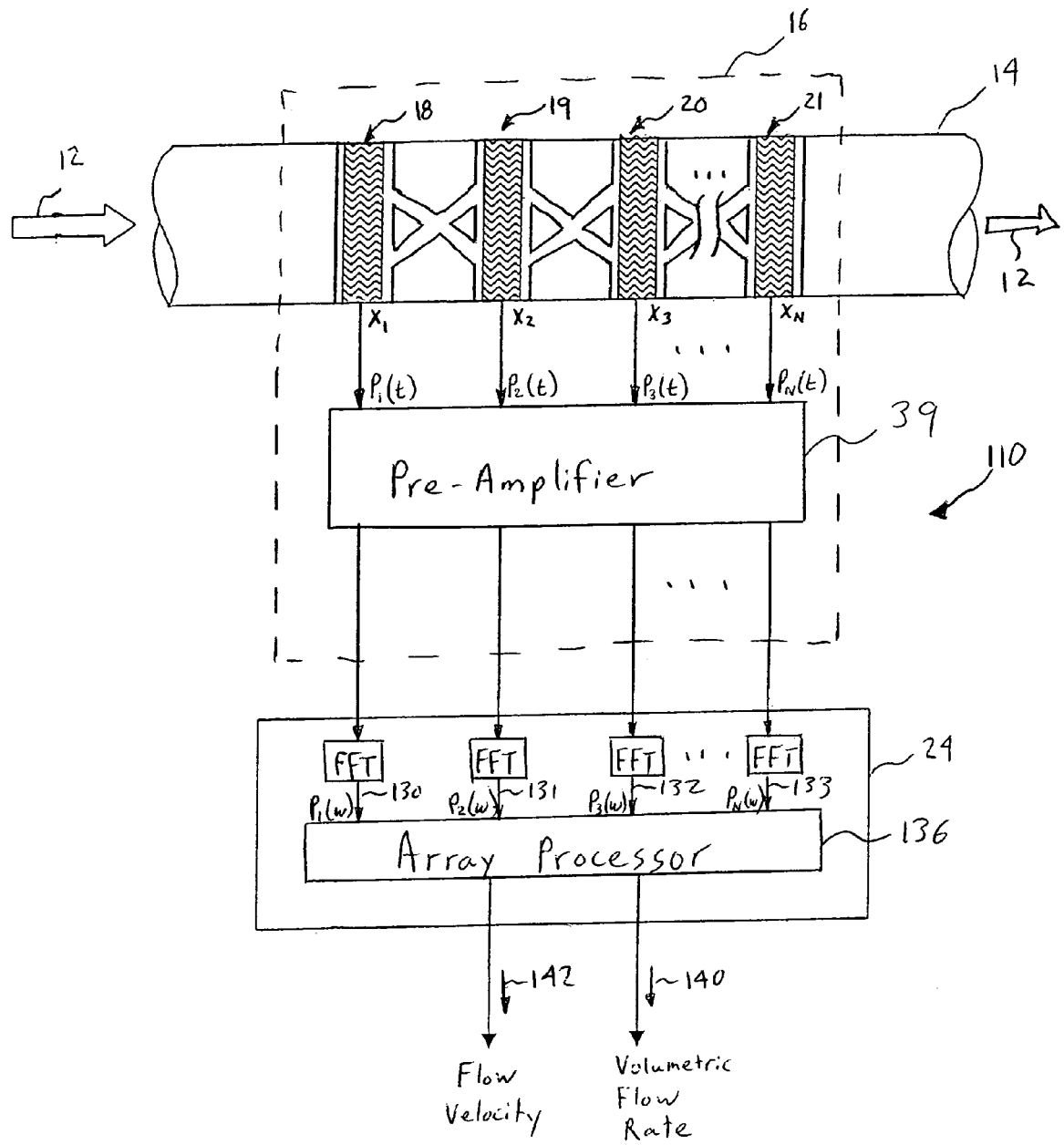
FIG. 11 is a block diagram of an apparatus for measuring the vortical field of a process flow within a pipe, in accordance with the present invention.

Referring to FIG. 11, the apparatus 110 can measure the volumetric flow rate of a single phase fluid 12 (e.g., gas and liquid) and/or a multi-phase mixture 12 (e.g., process flow) flowing through a pipe.

As discued hereinbefore, the flow meter 10 includes a sensing unit 16 comprising an array of sensors (or transducers) 18–21 spaced axially along a pipe 14, having a process flow 12 propagating therein. The sensors measure the unsteady and/or stochastic pressures of the fluid flowing within the pipe, which are indicative of the velocity of the process flow 12. The amplified output signals ($P_1(t)$–$P_N(t)$) of the sensors 18–21 are provided to the processor 24, which processes the measurement data of the stochastic parameters to determine the flow velocity 142 and/or the volumetric flow rate 140. The measurement is derived by interpreting a stochastic parameter within the process piping using multiple sensors 18–21 displaced axially over a predetermined length.

The flow meter 10 measures the velocities associated with stochastic pressure fields associate with the vortical eddies 188 (FIG. 12) propagating with the flow 12 to determine the velocity of the flow 12. Therefore, the velocity of the unsteady pressures is related to the velocity of the flow 12 and hence the volumetric flow rate may be determined, as will be described in greater detail hereinafter.

As shown in FIG. 11, the flow meter 10 has an array of at least two sensors 18,19, located at two locations $x_1, x_2$ axially along the pipe 14. One will appreciate that the sensor array may include more than two sensors as depicted by sensors 20,21 at locations $x_3$ and $x_N$. The stochastic pressures may be measured through sensors 18–21. The sensors provide time-varying signals $P_1(t), P_2(t), P_3(t), P_N(t)$ to a signal processor 24 to known Fast Fourier Transform (FFT) logics 130–133, respectively. The FFT logics 130–133 calculate the Fourier transform of the time-based input signals $P_1(t)$–$P_N(t)$ and provide complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$–$P_N(t)$, may be used.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

The frequency signals $P_1(\omega)$–$P_N(\omega)$ are fed to an array processor 136, which provides a flow signal 140 indicative of the volumetric flow rate of the process flow 12 and/or a velocity signal 142 indicative of the velocity of the process flow.

One technique of determining the convection velocity of the turbulent eddies 188 within the process flow 12 is by characterizing the convective ridge of the resulting unsteady pressures using an array of sensors or other beam forming techniques, similar to that described in U.S. patent application, Ser. No. 10/007,736, and U.S. patent application, Ser. No. 09/729,994, filed Dec. 4, 200, now U.S. Pat. No. 6,609,069, which are incorporated herein by reference.

The flow metering methodology uses the convection velocity of coherent structures within pipe flows 12 to determine the volumetric flow rate. The convection velocity of the eddies 188 is determined by applying arraying processing techniques to determine the speed at which the eddies convect past the axial array of sensors distributed along the pipe 14, similar to that used in the radar and sonar fields.

The array processing algorithms determine the speed of the stochastic parameters by characterizing both the temporal and spatially frequency characteristics of the flow field. For a series of coherent eddies 188 convecting past a fixed array of sensors, the temporal and spatial frequency content of stochastic fluctuations are related through the following relationship:

$$k = \frac{\omega}{U_{convect}}$$

Here k is the wave number, defined as $k=2\pi/\lambda$ and has units of 1/length, $\omega$ is the temporal frequency in rad/sec, and $U_{convect}$ is the convection velocity. Thus, the shorter the wavelength (larger k) is, the higher the temporal frequency.

In array processing, the spatial/temporal frequency content of time stationary sound fields are often displayed using "k-ω plots". K-ω plots are essentially three-dimensional power spectra in which the power of a sound field is decomposed into bins corresponding to specific spatial wave numbers and temporal frequencies. On a k-ω plot, the power associated with the unsteady pressure fields convecting with the flow is distributed in regions, which satisfies the dispersion relationship developed above. This region is termed "the convective ridge" (Beranek, 1992) and the slope of this ridge on a k-w plot indicates the convective velocity of the stochastic field. This suggests that the convective velocity of eddies 188, and hence flow rate within a pipe, can be determined by constructing a k-ω plot from the output of a phased array of sensor and identifying the slope of the convective ridge.

As described hereinbefore, the apparatus 110 of FIG. 11 is based on the observation that unsteady pressures of a moving fluid vary the signal, which can be sensed by sensors 140,142, and that a eddies 188 moves at either the same velocity as the moving fluid, or at a velocity that can be correlated to the velocity of the moving fluid. The array processing can be performed by exploiting what is sometimes called the dispersion relationship associated with convective disturbances (i.e. $\omega=uk$, where $\omega$ is the angular frequency of the signal of the vortical disturbance, u is the velocity of the disturbance, and k is the wavenumber of the signal). Convective eddies 188 parameters in a flowing fluid can be viewed as parameters that are fixed to the fluid. These parameters have a spatial variation associated with them. Since the eddies can be viewed as affixed to the fluid flow, the spatial variations result in temporal variations when sensed by stationary sensors. The spatial wavelength of the stochastic parameters that move with the fluid is thereby linked to the temporal variations observed by the stationary sensors. The present invention relies on utilizing array processing techniques to identify this relationship and thereby determine the convection velocity of the fluid.

Figure 13:
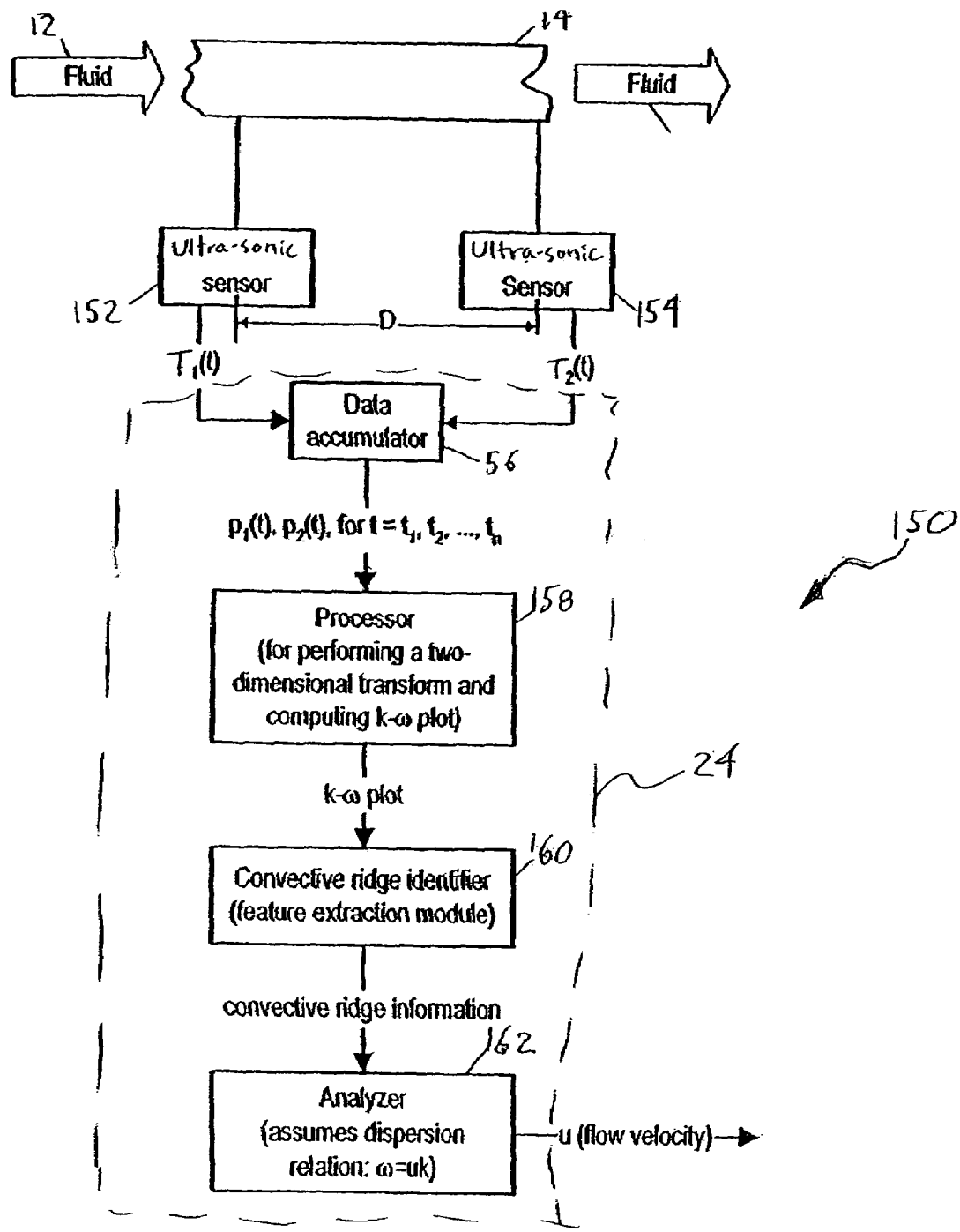
FIG. 13 is a block diagram of an apparatus for measuring the vortical field of a process flow within a pipe, in accordance with the present invention.

Referring now to FIG. 13, an apparatus 150, embodying the present invention, for determining a volumetric flow rate of a fluid 12 within a conduit (pipe) 14 is shown as including an array of sensors 152, 154 disposed axially along the pipe for sensing respective stochastic signals propagating between the sensors 140,142 within the pipe at their respective locations. Each sensor 18–21 provides a signal indicating an unsteady pressure at the location of each sensor, at each instant in a series of sampling instants. A data accumulator 156 accumulates the signals $P_1(t)$ and $P_2(t)$ from the sensors, and provides the data accumulated over a sampling interval to a processor 158, which performs a spatial-temporal (two-dimensional) transform of the sensor data, from the xt domain to the k-ω domain, and then calculates the power in the k-ω plane, as represented by k-ω plot.

To calculate the power in the k-ω plane, as represented by a k-ω plot (see FIG. 14) of either the signals or the differenced signals, the processor 158 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 152, 154.

Figure 14:
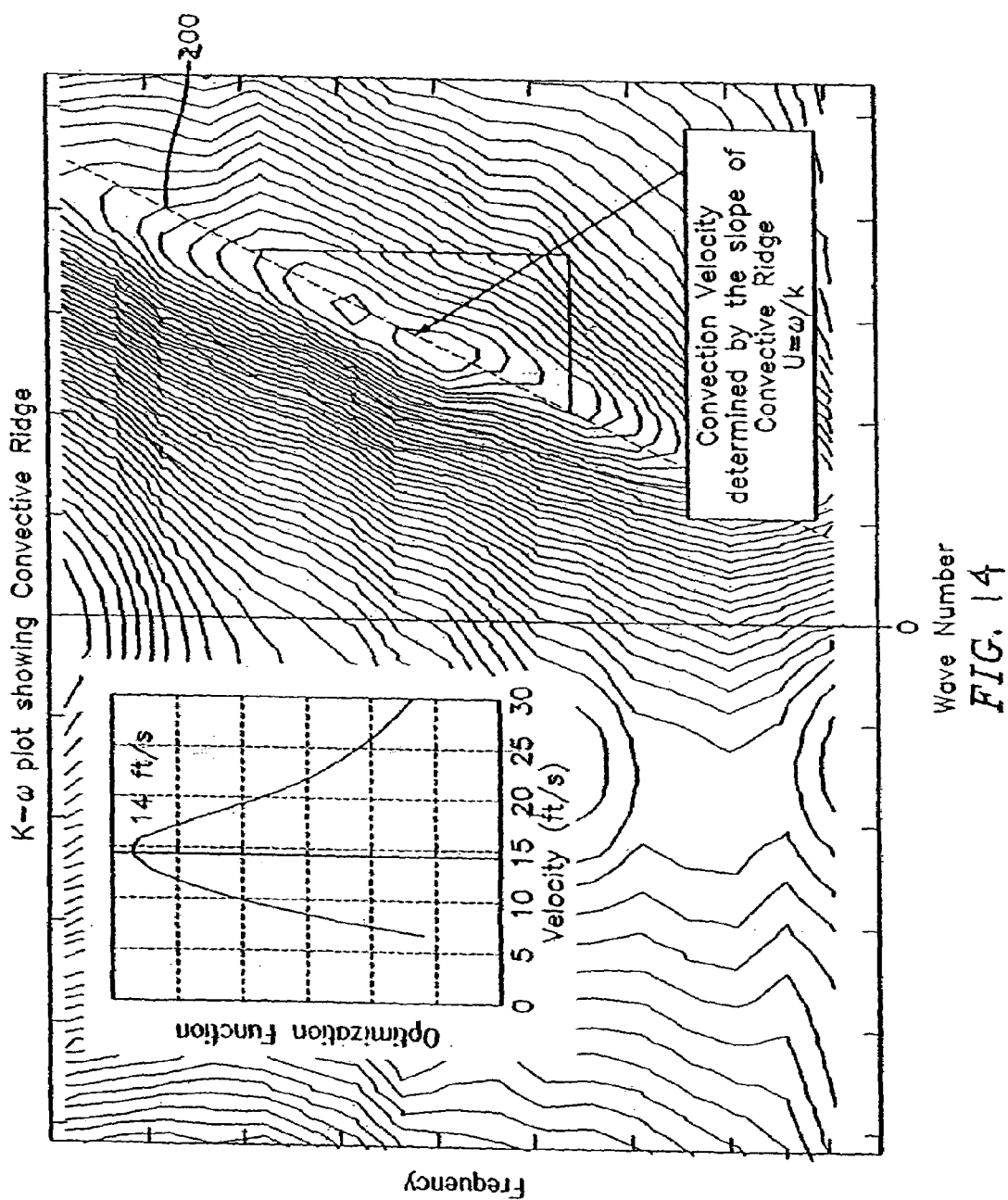
FIG. 14 a kω plot of data processed from an apparatus embodying the present invention that illustrates slope of the convective ridge, and a plot of the optimization function of the convective ridge, in accordance with the present invention.

In the case of suitable turbulent eddies 188 being present, the power in the k-ω plane shown in a k-ω plot of FIG. 14 so determined will exhibit a structure that is called a convective ridge 161. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 163 with some slope, the slope indicating the flow velocity, as is described in more detail below. The power in the k-ω plane so determined is then provided to a convective ridge identifier 160, which uses one or another feature extraction method to determine the location and orientation (slope) of any convective ridge present in the k-ω plane. Finally, information including the convective ridge orientation (slope) is used by an analyzer 162 to determine the flow velocity.

The processor 158 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 188 is distributed over a range of length scales and hence temporal frequencies.

Disturbances 188 that convect with a fluid flow 12 past the sensor array 152, 154 are transformed onto the convective ridge by the processor 158, the terminology ridge being appropriate because a k-ω plot indicates by one or another symbology the energy of k-ω pairs in the k-ω plane (i.e. the energy conveyed by the k-ω spectral component). Thus, identifying the convective ridge within the k-ω plane provides a means to determine the convective velocity. For flows within pipes, the convective velocity of the stochastic parameter is closely related to the average volumetric fluid velocity and therefore volumetric flow rate (flow velocity) within the pipe 14. While the apparatus 150 includes two sensors 152, 154, the present invention contemplates more than two sensors, such as 3 to 16 sensors in an array or more, for example.

Once the power in the k-ω plane is determined, the convective ridge identifier 160 uses one or another feature extraction methodology to discern a convective ridge 161 and its orientation in the k-ω plane. In addition to automate techniques, a convective ridge can be located using even manual, visual inspection. In the preferred embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 60 provides information about the different trial convection velocities, information referred to generally as convective ridge information. The analyzer 162 examines the convective ridge information and, assuming the straight-line dispersion relation given by equation (1), determines the flow velocity and its uncertainty.

In sensing both spatial and temporal characteristics of a wavelike phenomenon using an array of sensor units 152, 154, the spatial length scales and coherence lengths of the phenomenon constrain the length scale of the array. Thus, in the case of measuring the flow velocity by sensing vortical disturbances, sensors must be closely spaced and located within a limited axial region; for flow velocities of less than 30 ft/sec in a three-inch diameter pipe, the sensor units should usually be spaced less than 1" apart. The axial region is approximately 0.3 of the diameter of the pipe 14.

FIG. 4 shows an example of a k-ω plot generated from a phased array of pressure sensors. The power contours show a well-defined convective ridge. A parametric optimization method was used to determine the "best" line representing the slope of the convective ridge 200. For this case, a slope of 14.2 ft/sec was determined. The intermediate result of the optimization procedure is displayed in the insert, showing that optimized value is a unique and well-defined optima.

Figure 15:
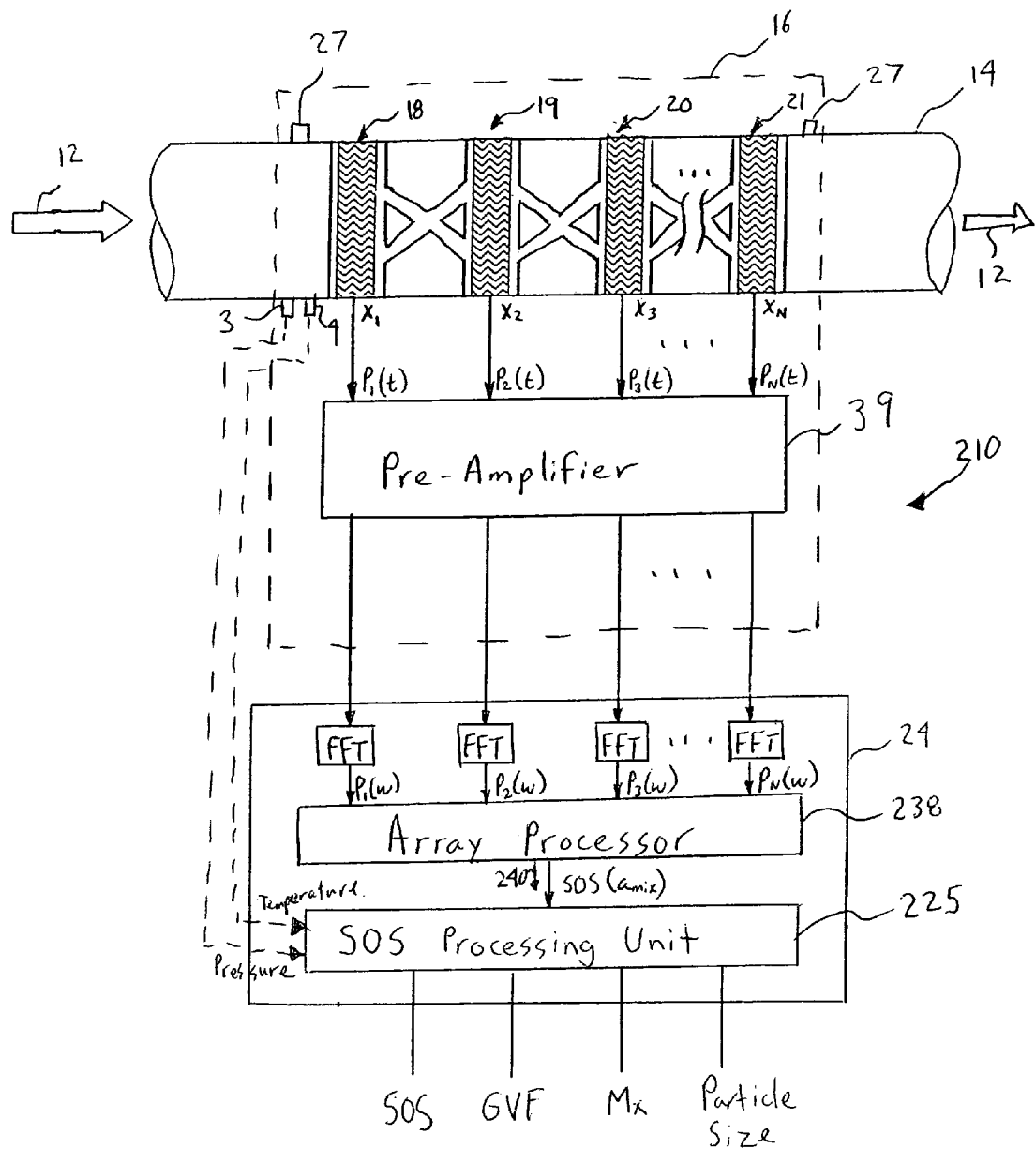
FIG. 15 is a block diagram of an apparatus for measuring the speed of sound propagating through a process flow flowing within a pipe, in accordance with the present invention.

Referring to FIG. 15, an apparatus 210 measures the speed of sound (SOS) to determine various characteristics of the fluid flow, as described hereinbefore.

The following approach may be used with any technique that measures the sound speed of a flow or speed at which sound propagates through the flow 12. However, it is particularly synergistic with flow meters using sonar-based array processing, such as described in U.S. Patent Application Ser. No. 10/007,736 and U.S. patent application Ser. No. 09/729,994, filed Dec. 4, 200, now U.S. Pat. No. 6,609,069, which are incorporated herein by reference. While the sonar-based flow meter using an array of sensors to measure the speed of sound of an acoustic wave propagating through the mixture is shown and described, one will appreciate that any means for measuring the speed of sound of the acoustic wave may used to determine the entrained gas volume fraction of the mixture/fluid.

Figure 16:
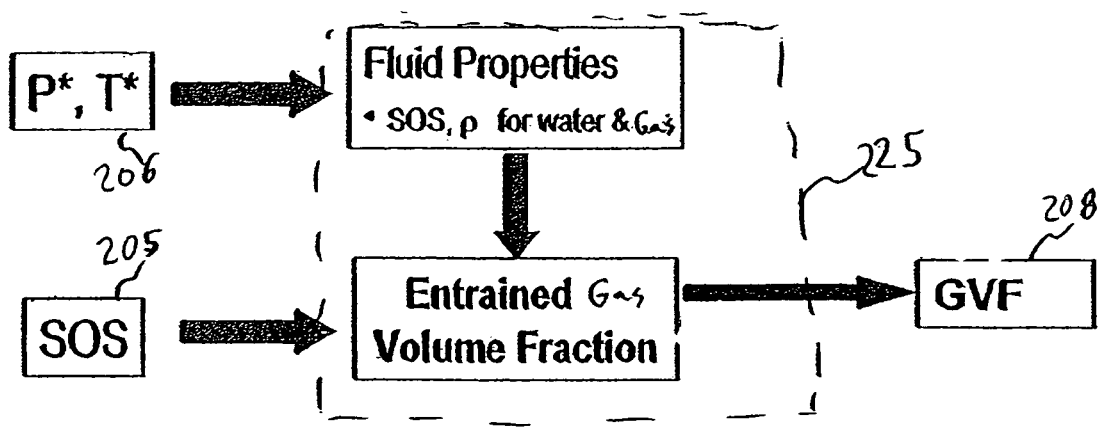
FIG. 16 is a block diagram of the processing unit of the apparatus of FIG. 15, in accordance with the present invention.

A flow chart 213 shown in FIG. 16 illustrates the function of the SOS processing unit 225. As shown in FIG. 16, the inputs to the processing unit 25 include the speed of sound (SOS) 205 within the flow 12 in the pipe 14, and the pressure and/or temperature of the flow. The fluid properties of the mixture (e.g., SOS and density) are determined knowing the pressure and temperature of the mixture. The gas volume fraction of the flow (GVF) (or other characteristic of the flow) is determined using the SOS measurement and fluid properties, which will be described in greater detail hereinafter.

Other information relating to the gas volume fraction in a fluid and the speed of sound (or sonic velocity) in the fluid, is described in "Fluid Mechanics and Measurements in two-phase flow Systems", Institution of mechanical engineers, proceedings 1969–1970 Vol. 184 part 3C, Sep. 24–25 1969, Birdcage Walk, Westminster, London S.W. 1, England, which is incorporated herein by reference.

FIG. 15 illustrates a schematic drawing of one embodiment of the present invention. The apparatus 210 includes a sensing device 16 comprising an array of pressure sensors (or transducers) 18–21 spaced axially along the outer surface 22 of a pipe 14, having a process flow propagating therein. The pressure sensors measure the unsteady pressures produced by acoustical disturbances within the pipe, which are indicative of the SOS propagating through the mixture 12. The output signals ($P_1$–$P_N$) of the pressure sensors 18–21 are provided to the processor 24, which processes the pressure measurement data and determines the speed of sound and gas volume fraction (GVF).

In an embodiment of the present invention shown in FIG. 15, the apparatus 210 has at least pressure sensors 18–21 disposed axially along the pipe 14 for measuring the unsteady pressure $P_1$–$P_N$ of the flow 12 flowing therethrough.

The apparatus 210 has the ability to measure the gas volume fraction by determining the speed of sound of acoustical disturbances or sound waves propagating through the flow 12 using the array of pressure sensors 18–21. While the apparatus of FIG. 15 shows at least four pressure sensors 18–21, the present invention contemplates an apparatus having an array of two or more pressure sensors and having as many as sixteen (16) pressure sensors.

Generally, the apparatus 210 measures unsteady pressures created by acoustical disturbances propagating through the flow 12 to determine the speed of sound (SOS) propagating through the flow. Knowing the pressure and/or temperature of the flow and the speed of sound of the acoustical disturbances, the processing unit 24 can determine the gas volume fraction of the flow (and other characteristics of the flow), as described and shown in FIG. 15.

The apparatus 210 in FIG. 15 also contemplates providing one or more acoustic sources 27 to enable the measurement of the speed of sound propagating through the flow for instances of acoustically quiet flow. The acoustic source may be a device the taps or vibrates on the wall of the pipe, for example. The acoustic sources may be disposed at the input end of output end of the array of sensors 18–21, or at both ends as shown. One should appreciate that in most instances the acoustics sources are not necessary and the apparatus passively detects the acoustic ridge provided in the flow 12. The passive noise includes noise generated by pumps, valves, motors, and the turbulent mixture itself.

The apparatus 10 of the present invention measures the speed of sound (SOS) of one-dimensional sound waves propagating through the mixture to determine the gas volume fraction o f the mixture. It is known that sound propagates through various mediums at various speeds in such fields as SONAR and RADAR fields. The speed of sound propagating through the pipe and mixture 12 may be determined using a number of known techniques, such as those set forth in U.S. patent application Ser. No. 09/344,094, entitled "Fluid Parameter Measurement in Pipes Using Acoustic Pressures", filed Jun. 25, 1999, now U.S. Pat. No. 6,354,147; U.S. patent application Ser. No. 09/729,994, filed Dec. 4, 2002, now U.S. Pat. No. 6,609,069; U.S. patent application Ser. No. 09/997,221, filed Nov. 28, 2001, now U.S. Pat. No. 6,587,798; and U.S. patent application Ser. No. 10/007,749, entitled "Fluid Parameter Measurement in Pipes Using Acoustic Pressures", filed Nov. 7, 2001, each of which are incorporated herein by reference.

As shown in FIG. 15, an apparatus 210 embodying the present invention has an array of at least two acoustic pressure sensors 18,19, located at three locations $x_1, x_2$ axially along the pipe 14. One will appreciate that the sensor array may include more than two pressure sensors as depicted by pressure sensor 20,21 at location $x_3, x_N$. The pressure generated by the acoustic waves may be measured through pressure sensors 18–21. The pressure sensors 18–21 provide pressure time-varying signals $P_1(t), P_2(t), P_3(t), P_N(t)$ to a signal processing unit 24 to known Fast Fourier Transform (FFT) logics. The FFT logics calculate the Fourier transform of the time-based input signals $P_1(t)$–$P_N(t)$ and provide complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$–$P_N(t)$, may be used. For example, the cross-spectral density and the power spectral density may be used to form a frequency domain transfer functions (or frequency response or ratios) discussed hereinafter.

The frequency signals $P_1(\omega)$–$P_N(\omega)$ are fed to an array processing unit 238 which provides a signal to line 240 indicative of the speed of sound of the mixture $a_{mix}$, discussed more hereinafter. The $a_{mix}$ signal is provided to a SOS processing unit 225, similar to the processing unit 25, which converts $a_{mix}$ to a percent composition of a mixture and provides a gas volume fraction output, as discussed hereinafter.

Similar to array processing described hereinbefore for the array processor 136 of FIG. 11 the data from the array of sensors 1821 may be processed in any domain, including the frequency/spatial domain, the temporal/spatial domain, the temporal/wave-number domain or the wave-number/frequency (k-ω) domain. As such, any known array processing technique in any of these or other related domains may be used if desired, similar to the techniques used in the fields of SONAR and RADAR.

Figure 17:
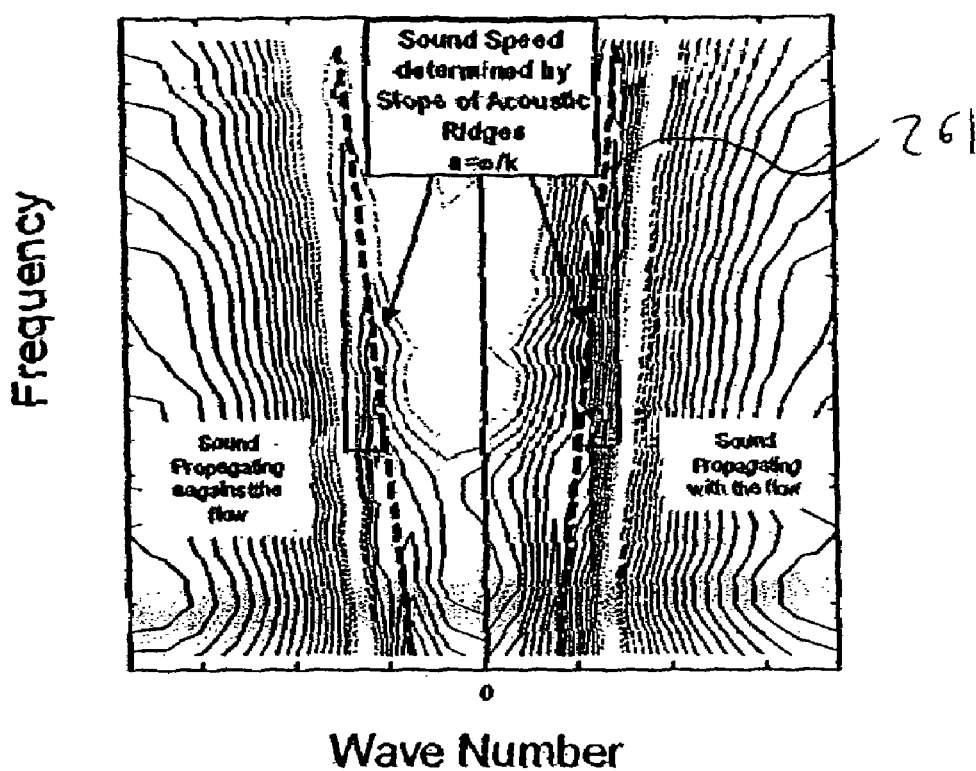
FIG. 17 a kω plot of data processed from an apparatus embodying the present invention that illustrates slope of the acoustic ridges, in accordance with the present invention.

One such technique of determining the speed of sound propagating through the flow 12 is using array processing techniques to define an acoustic ridge in the k-ω plane as shown in FIG. 17. The slope of the acoustic ridge is indicative of the speed of sound propagating through the flow 12. This technique is similar to that described in U.S. Pat. No. 6,587,798 filed Nov. 28, 2001, titled "Method and System for Determining The Speed of Sound in a Fluid Within a Conduit", which is incorporated herein by reference. The speed of sound (SOS) is determined by applying sonar arraying processing techniques to determine the speed at which the one dimensional acoustic waves propagate past the axial array of unsteady pressure measurements distributed along the pipe 14.

The signal processor 24 performs a Fast Fourier Transform (FFT) of the time-based pressure signals $P_1(t)$–$P_N(t)$ to convert the pressure signal into the frequency domain. The power of the frequency-domain pressure signals are then determined and defined in the k-ω plane by using array processing algorithms (such as Capon and Music algorithms). The acoustic ridge in the k-ω plane, as shown in the k-ω plot of FIG. 17, is then determined. The speed of sound (SOS) is determined by measuring slope of the acoustic ridge. The gas volume fraction is then calculated or otherwise determined, as described hereinafter.

The flow meter of the present invention uses known array processing techniques, in particular the Minimum Variance, Distortionless Response (MVDR, or Capon technique), to identify pressure fluctuations, which convect with the materials flowing in a conduit and accurately ascertain the velocity, and thus the flow rate, of said material. These processing techniques utilize the covariance between multiple sensors 18–21 at a plurality of frequencies to identify signals that behave according to a given assumed model; in the case of the apparatus 210, a model, which represents pressure variations 20 convecting at a constant speed across the pressure sensors comprising the flow meter monitoring head 12.

To calculate the power in the k-ω plane, as represent by a k-ω plot (see FIG. 17) of either the pressure signals, the processor 238 determines the wavelength and so the (spatial) wavenumber k, and also the (temporal) frequency and so the angular frequency ω, of various spectral components of the acoustic waves created passively or actively within the pipe. There are numerous algorithms available in the public domain to perform the spatial/temporal decomposition of arrays of sensor units 18–21.

In the case of suitable acoustic pressures being present, the power in the k-ω plane shown in a k-ω plot of FIG. 17 so determined will exhibit a structure that is called an acoustic ridge 261 associated with sound propagating with the flow and one associated with sound propagating against the flow. The acoustic ridge represents the concentration of the disturbances that propagate with and against the flow and is a mathematical manifestation of the relationship between the spatial variations and temporal variations described above. Such a plot will indicate a tendency for k-ω pairs to appear more or less along a line with some slope, the slope indicating the speed of sound traveling in both directions, as is described in more detail below. The power in the k-ω plane so determined is then provided to a acoustic ridge identifier, which uses one or another feature extraction method to determine the location and orientation (slope) of any acoustic ridge present in the k-ω plane. Finally, information including the acoustic ridge orientation (slope) is used by an analyzer to determine the speed of sound.

The array processing unit 238 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

Also, so me or all of the functions within the processor 130 may be implemented in software (using a microprocessor or computer) and/or firmware, or may be implemented using analog and/or digital hardware, having sufficient memory, interfaces, and capacity to perform the functions described herein.

While the description has describe the apparatus as two separate meters that measure the vortical disturbances and the speed of sound, respectively, as suggested by FIG. 1, the processing could function as two separate meters, a combination (simultaneous operation) of both function, or selectively chose between operations.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A sensing device for measuring a parameter of a process flow flowing within a pipe, the device comprising:
   a strap having at least two bands, wherein the bands are interconnected to provide a predetermined spacing therebetween, each of the bands having opposing ends which are securable together to clamp the strap around the outer surface of the pipe; and
   at least two strain sensors comprising piezoelectric film material, each of which is mounted to a respective band of said strap, wherein the strain sensors provide respective pressure signals indicative of the unsteady pressure within the pipe.

2. The sensing device of claim 1, wherein the at least two bands include one of 4, 5, 6, 7, 8, 9, 10, 11, 12, 13, 14, 15, 16, 17, 18, 19 and 20 bands having a respective strain sensor comprising piezoelectric film material mounted thereto.

3. The sensing device of claim 1, wherein the at least two strain sensors are mounted along the substantial length of the respective band.

4. The sensing device of claim 1, wherein the at least two strain sensors are mounted along some portion of the respective band less than the substantial length of the bands.

5. The sensing device of claim 1, wherein the strap includes at least one cross-member that interconnects the at least two bands.

6. The sensing device of claim 1, wherein the bands are substantially parallel to each other.

7. The sensing device of claim 1, wherein at least one of the opposing ends of the bands are interconnected by an end strip.

8. The sensing device of claim 1, wherein the strap is formed of metallic sheet material.

9. The sensing device of claim 8, wherein the strap includes cut outs to provide cross members between the bands.

10. The sensing device of claim 1, wherein the strap includes a rail extending across the respective opposing ends of the bands to permit attachment of the ends together when mounted on the pipe.

11. The sensing device of claim 1, wherein the strap includes a plurality of rails disposed at respective opposing ends of the bands to permit independent attachment of the ends of the bands together when mounted on the pipe.

12. The sensing device of claim 1, wherein an electrically insulative sheet is disposed between the strap and the pipe.

13. The sensing device of claim 1, further includes a conductive shield disposed over the strap and strain sensors.

14. The sensing device of claim 13, wherein the conductive shield is a metallic sheet, a metallic web or a metallic screen.

15. The sensing device of claim 14, further includes an electrically insulative sheet disposed between the strain sensors and the shield.

16. The sensing device of claim 13, further includes a plurality of standoffs disposed between the bands to prevent the shield from contacting the strain sensors.

17. The sensing device of claim 1, further includes a circuit board disposed at one end of the bands to provide an electrical path for signals generated by the strain sensors.

18. The sensing device of claim 1, wherein the piezoelectric film material is at least one of polyvynalforidene (PVDF), co-polymer film, and flexible PZT sensors.

19. The sensing device of claim 1, further including a cover disposed over the strap and strain sensors.

20. The sensing device of claim 1, further includes a pre-amplifier unit to adjust the gain of output signals of the strain sensors.

21. The sensing device of claim 1, wherein the pressure signals are indicative of convective pressure disturbances in the fluid flow.

22. The sensing device of claim 1, wherein the pressure signals are indicative of acoustic pressure in the fluid flow.

23. The sensing device of claim 1, further includes at least one fastener for attaching the opposing ends of each respective band of the strap.

24. The sensing device of claim 23, wherein the fastener is removable.

25. The sensing device of claim 1, wherein each of the at least two strain sensors include a plurality of segments of piezoelectric film material.

26. The sensing device of claim 25, wherein the bands are equally spaced.

27. The sensing device of claim 1, wherein the at least two bands include three bands having a respective strain sensor comprising piezoelectric film material mounted thereto.

28. The sensing device of claim 1, wherein the strain sensors include pressure sensors.

29. The sensing device of claim 1, wherein the ends of respective bands are independently attached to each other to mechanically isolated the fastened ends of the respective bands.

30. The sensing device of claim 1, wherein respective ends of one side of the bands are interconnected and the respective ends of the other side of the bands are interconnected.

31. An apparatus for measuring a parameter of a process flow flowing within a pipe, the apparatus comprising:
  a sensor device for measuring unsteady pressures within the pipe, the sensor device includes:
    a strap having at least two bands, wherein the bands are interconnected to provide a predetermined spacing therebetween, each of the bands having opposing ends which are securable together to clamp the strap around the outer surface of the pipe; and
    at least two strain sensors comprising piezoelectric film material, each of which is mounted to a respective band of said strap, wherein the strain sensors provide respective pressure signals indicative of the unsteady pressure within the pipe; and
  a processing unit for determining the parameter of the process flow in response to the pressure signals.

32. The apparatus of claim 31, wherein the processor determines the slope of an acoustic ridge in the k-ω plane to determine a parameter of the process flow flowing in the pipe.

33. The apparatus of claim 31, wherein the pressure signals are indication of vortical disturbances within the fluid flow.

34. The apparatus of claim 33, wherein the parameter of the fluid is one of velocity of the process flow and the volumetric flow of the process fluid.

35. The apparatus of claim 31, wherein the processor determines the slope of a convective ridge in the k-ω plane to determine the velocity of the fluid flowing in the pipe.

36. The apparatus of claim 31, wherein the at least two strain sensors are mounted along the substantial length of the respective band.

37. The apparatus of claim 31, wherein the strap includes at least one cross-member that interconnects the at least two bands.

38. The apparatus of claim 31, wherein the strap includes a rail extending across the respective opposing ends of the bands to permit attachment of the ends together when mounted on the pipe.

39. The apparatus of claim 31, wherein the strap includes a plurality of rails disposed at respective opposing ends of the bands to permit independent attachment of the ends of the bands together when mounted on the pipe.

40. The apparatus of claim 31, further includes a conductive shield disposed over the strap and pressure sensors.

41. The apparatus of claim 31, further includes a pre-amplifier unit to adjust the gain of output signals of the strain sensors.

42. The apparatus of claim 31, further includes at least one fastener for attaching the opposing ends of each respective band of the strap.

43. The apparatus of claim 31, wherein the at least two strain sensors are mounted along some portion of the respective band less than the substantial length of the bands.

44. The apparatus of claim 31, wherein each of the at least two strain sensors include a plurality of segments of piezoelectric film material.

45. The apparatus of claim 31, wherein the at least two bands include three bands having a respective strain sensor comprising piezoelectric film material mounted thereto.

* * * * *